US012586046B2

(12) United States Patent
Wied et al.

(10) Patent No.:    US 12,586,046 B2
(45) Date of Patent:       Mar. 24, 2026

(54) SYSTEMS AND METHODS FOR EXECUTING REAL-TIME ELECTRONIC TRANSACTIONS BY A DYNAMICALLY DETERMINED TRANSFER EXECUTION DATE

(71) Applicant: Worldpay, LLC, Symmes Township, OH (US)

(72) Inventors: William J. Wied, Austin, TX (US); Aman S. Cheema, Warwickshire (GB); Manuela Dragan, Westfield, NJ (US); Stephen E. Dinan, Austin, TX (US)

(73) Assignee: Worldpay, LLC, Symmes Township, OH (US)

( * ) Notice:   Subject to any disclaimer, the term of this patent is extended or adjusted under 35 U.S.C. 154(b) by 0 days.

(21) Appl. No.: 17/654,673

(22) Filed:   Mar. 14, 2022

(65)              Prior Publication Data
        US 2023/0289750 A1      Sep. 14, 2023

(51) Int. Cl.
*G06Q 20/04*       (2012.01)
*G06Q 20/02*       (2012.01)
        (Continued)

(52) U.S. Cl.
CPC ......... *G06Q 20/047* (2020.05); *G06Q 20/023* (2013.01); *G06Q 20/065* (2013.01); *G06Q 20/102* (2013.01)

(58) Field of Classification Search
None
See application file for complete search history.

(56)              References Cited

U.S. PATENT DOCUMENTS 6,247,000  B1 *    6/2001   Hawkins  ................  G06Q 40/04
                                                            705/37
6,711,137  B1 *    3/2004   Klassen  ................  H04L 41/142
                                                            370/252
                    (Continued)

FOREIGN PATENT DOCUMENTS

AU           2004202125  A1 *  12/2004    .............  G06Q 30/08
CA              3206785  A1 *   9/2022    .............  G06N 20/00
                    (Continued)

OTHER PUBLICATIONS

Google Patents English language translation of CN-112866201-A. https://patents.google.com/patent/CN112866201A/en?oq=CN-112866201-A (Year: 2024).*
                    (Continued)

*Primary Examiner* — Ayal I. Sharon
(74) *Attorney, Agent, or Firm* — Bookoff McAndrews, PLLC

(57)              ABSTRACT

Systems and methods for executing real-time electronic transactions by a dynamically determined transfer execution date are disclosed. One method includes receiving, at an application programing interface (API) system, an electronic transaction request on a receipt date. The API system may identify a value associated with the electronic transaction request as well as a threshold settlement date. The value may then be compared to a predetermined threshold and at least one transaction network certified to process the electronic transaction request may be ascertained. The API system may project a processing time for each of the ascertained transaction networks. An optimal transaction network and transfer execution date may be determined based on comparison of the projected processing times to a timeline designated by the receipt date and the threshold settlement date. The electronic transaction request may be processed into a
                    (Continued)

100 recipient account on the transfer execution date via the optimal transaction network.

20 Claims, 11 Drawing Sheets

(51) Int. Cl.
   *G06Q 20/06*        (2012.01)
   *G06Q 20/10*        (2012.01)

(56)                 References Cited

U.S. PATENT DOCUMENTS

| | | | |
|---|---|---|---|
| 6,999,943 B1 | 2/2006 | Johnson et al. | |
| 9,978,068 B2 | 5/2018 | Hamilton et al. | |
| 11,272,004 B2 * | 3/2022 | Sarin | G06Q 20/389 |
| 2003/0050879 A1 * | 3/2003 | Rosen | G06Q 40/02 |
| | | | 705/37 |
| 2003/0220863 A1 * | 11/2003 | Holm | G06Q 40/04 |
| | | | 705/37 |
| 2004/0068454 A1 * | 4/2004 | Jacobus | G06Q 10/087 |
| | | | 705/36 R |
| 2004/0068455 A1 * | 4/2004 | Jacobus | G06Q 30/0202 |
| | | | 705/36 R |
| 2005/0010613 A1 | 1/2005 | Lejdstrom et al. | |
| 2005/0246289 A1 * | 11/2005 | Alexander | G06Q 20/023 |
| | | | 705/67 |
| 2006/0036531 A1 * | 2/2006 | Jackson | G06Q 20/042 |
| | | | 705/37 |
| 2006/0095362 A1 * | 5/2006 | Hwang | G06Q 40/06 |
| | | | 705/37 |
| 2006/0122850 A1 * | 6/2006 | Ward | G06Q 20/386 |
| | | | 705/64 |
| 2006/0224494 A1 * | 10/2006 | Pinkava | G06Q 40/04 |
| | | | 705/37 |
| 2007/0100748 A1 | 5/2007 | Dheer et al. | |
| 2008/0103923 A1 | 5/2008 | Rieck et al. | |
| 2012/0173349 A1 * | 7/2012 | Buckley | G06Q 20/10 |
| | | | 705/16 |
| 2012/0209762 A1 * | 8/2012 | Metaireau | G06Q 20/10 |
| | | | 705/39 |
| 2013/0103577 A1 * | 4/2013 | Lawson | G06Q 20/405 |
| | | | 705/39 |
| 2013/0138557 A1 * | 5/2013 | Mullen | G06Q 30/06 |
| | | | 705/39 |
| 2014/0032399 A1 * | 1/2014 | Gonthier | G06Q 20/027 |
| | | | 705/39 |
| 2014/0040114 A1 * | 2/2014 | Baumgart | G06Q 20/102 |
| | | | 705/39 |
| 2015/0142663 A1 * | 5/2015 | Lawson | G06Q 20/306 |
| | | | 705/44 |
| 2016/0104132 A1 | 4/2016 | Abbatiello et al. | |
| 2016/0104133 A1 | 4/2016 | Moore et al. | |
| 2016/0275495 A1 * | 9/2016 | Sharan | G06Q 20/38 |
| 2017/0098216 A1 * | 4/2017 | Studnitzer | G06Q 20/4014 |
| 2017/0221066 A1 * | 8/2017 | Ledford | G06Q 20/4016 |
| 2017/0243207 A1 * | 8/2017 | Lorberg | G06Q 20/40 |
| 2017/0270493 A1 * | 9/2017 | Lugli | G06Q 20/10 |
| 2017/0278081 A1 | 9/2017 | Walker et al. | |
| 2017/0364915 A1 | 12/2017 | Levy et al. | |
| 2018/0012202 A1 * | 1/2018 | Jimenez | G06Q 40/02 |
| 2018/0253727 A1 | 9/2018 | Edison et al. | |
| 2019/0318424 A1 | 10/2019 | McWilliams et al. | |
| 2019/0325447 A1 * | 10/2019 | Studnitzer | G06Q 20/4014 |
| 2020/0051117 A1 * | 2/2020 | Mitchell | G06Q 30/0239 |
| 2020/0074416 A1 * | 3/2020 | Mathew | G06Q 20/24 |
| 2020/0250635 A1 | 8/2020 | Kettler et al. | |
| 2020/0387923 A1 * | 12/2020 | Mitchell | G06Q 20/12 |
| 2021/0182810 A1 * | 6/2021 | Johnston | G06Q 20/381 |
| 2021/0201304 A1 | 7/2021 | Kaushal et al. | |
| 2021/0201321 A1 * | 7/2021 | Studnitzer | G06Q 20/4014 |
| 2021/0390544 A1 * | 12/2021 | Terrell | G06Q 20/405 |
| 2022/0012707 A1 * | 1/2022 | Gopalakrishnan Nair | |
| | | | G06Q 20/10 |
| 2022/0215392 A1 * | 7/2022 | Wied | G06Q 20/4014 |
| 2022/0253854 A1 * | 8/2022 | Studnitzer | G06Q 20/385 |
| 2022/0300917 A1 * | 9/2022 | Wied | G06Q 20/027 |
| 2022/0391892 A1 * | 12/2022 | Wied | G06Q 20/401 |
| 2023/0069798 A1 * | 3/2023 | Wied | G06Q 20/065 |
| 2023/0101469 A1 * | 3/2023 | Wied | G06Q 20/108 |
| | | | 705/39 |
| 2023/0289751 A1 * | 9/2023 | Wied | G06Q 20/02 |

FOREIGN PATENT DOCUMENTS

| | | | | | |
|---|---|---|---|---|---|
| CN | 110473107 A | * | 11/2019 | | |
| CN | 112866201 A | * | 5/2021 | | |
| CN | 113537968 A | * | 10/2021 | | G06Q 40/04 |
| EP | 3605422 A1 | | 2/2020 | | |
| WO | WO-9858333 A1 | * | 12/1998 | | G06Q 40/04 |
| WO | WO-2006103474 A2 | * | 10/2006 | | G06Q 40/00 |
| WO | WO-2010089593 A1 | * | 8/2010 | | G06Q 20/10 |
| WO | 2016084074 A1 | | 6/2016 | | |
| WO | 2018005635 A2 | | 1/2018 | | |
| WO | WO-2021033184 A1 | * | 2/2021 | | G06N 3/04 |
| WO | WO-2022150091 A1 | * | 7/2022 | | G06F 9/547 |

OTHER PUBLICATIONS

Google Patents English language translation of CN-110473107-A. https://patents.google.com/patent/CN110473107A/en?oq=CN-110473107-A (Year: 2024).*

Google Patents English Language Translation for CN 113537968 A. https://patents.google.com/patent/CN113537968A/en?oq=CN+113537968+A. Jun. 8, 2021 (Year: 2021).*

International Search Report issued in International Application No. PCT/US2023/063908 dated May 2, 2023 (12 pages).

* cited by examiner

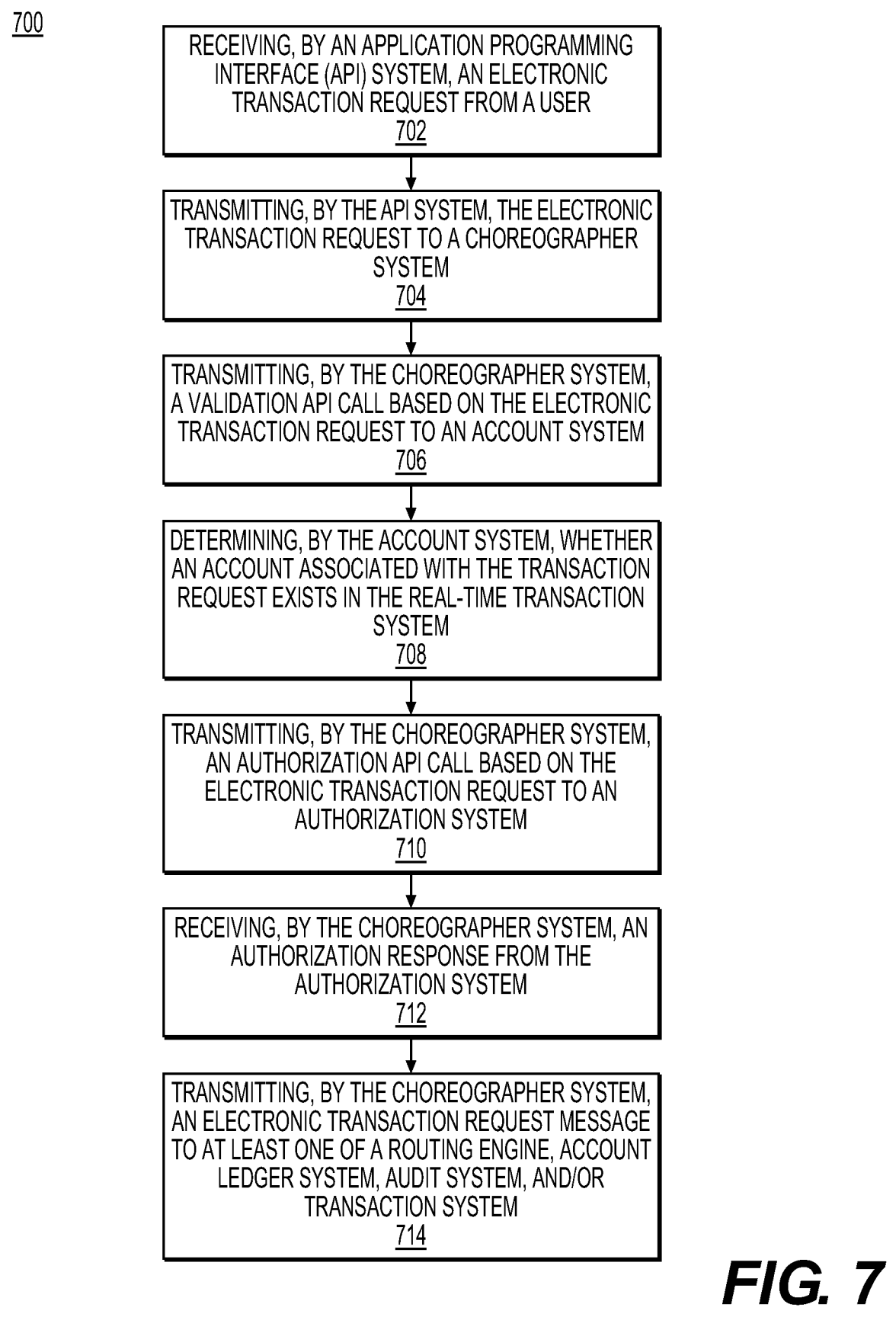

700

RECEIVING, BY AN APPLICATION PROGRAMMING INTERFACE (API) SYSTEM, AN ELECTRONIC TRANSACTION REQUEST FROM A USER
702

TRANSMITTING, BY THE API SYSTEM, THE ELECTRONIC TRANSACTION REQUEST TO A CHOREOGRAPHER SYSTEM
704

TRANSMITTING, BY THE CHOREOGRAPHER SYSTEM, A VALIDATION API CALL BASED ON THE ELECTRONIC TRANSACTION REQUEST TO AN ACCOUNT SYSTEM
706

DETERMINING, BY THE ACCOUNT SYSTEM, WHETHER AN ACCOUNT ASSOCIATED WITH THE TRANSACTION REQUEST EXISTS IN THE REAL-TIME TRANSACTION SYSTEM
708

TRANSMITTING, BY THE CHOREOGRAPHER SYSTEM, AN AUTHORIZATION API CALL BASED ON THE ELECTRONIC TRANSACTION REQUEST TO AN AUTHORIZATION SYSTEM
710

RECEIVING, BY THE CHOREOGRAPHER SYSTEM, AN AUTHORIZATION RESPONSE FROM THE AUTHORIZATION SYSTEM
712

TRANSMITTING, BY THE CHOREOGRAPHER SYSTEM, AN ELECTRONIC TRANSACTION REQUEST MESSAGE TO AT LEAST ONE OF A ROUTING ENGINE, ACCOUNT LEDGER SYSTEM, AUDIT SYSTEM, AND/OR TRANSACTION SYSTEM
714

*FIG. 7*

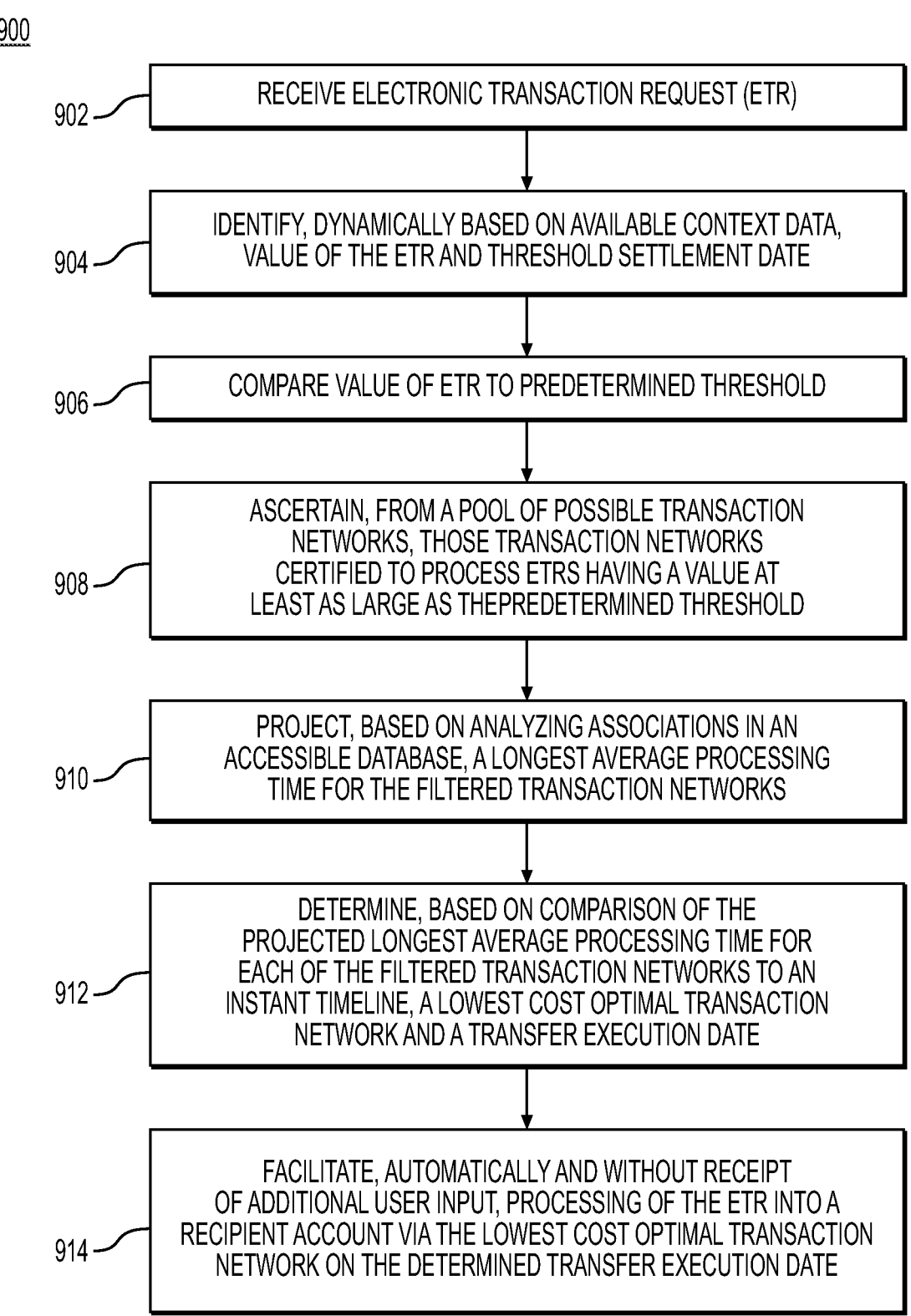

900

902 — RECEIVE ELECTRONIC TRANSACTION REQUEST (ETR)

904 — IDENTIFY, DYNAMICALLY BASED ON AVAILABLE CONTEXT DATA, VALUE OF THE ETR AND THRESHOLD SETTLEMENT DATE

906 — COMPARE VALUE OF ETR TO PREDETERMINED THRESHOLD

908 — ASCERTAIN, FROM A POOL OF POSSIBLE TRANSACTION NETWORKS, THOSE TRANSACTION NETWORKS CERTIFIED TO PROCESS ETRS HAVING A VALUE AT LEAST AS LARGE AS THEPREDETERMINED THRESHOLD

910 — PROJECT, BASED ON ANALYZING ASSOCIATIONS IN AN ACCESSIBLE DATABASE, A LONGEST AVERAGE PROCESSING TIME FOR THE FILTERED TRANSACTION NETWORKS

912 — DETERMINE, BASED ON COMPARISON OF THE PROJECTED LONGEST AVERAGE PROCESSING TIME FOR EACH OF THE FILTERED TRANSACTION NETWORKS TO AN INSTANT TIMELINE, A LOWEST COST OPTIMAL TRANSACTION NETWORK AND A TRANSFER EXECUTION DATE

914 — FACILITATE, AUTOMATICALLY AND WITHOUT RECEIPT OF ADDITIONAL USER INPUT, PROCESSING OF THE ETR INTO A RECIPIENT ACCOUNT VIA THE LOWEST COST OPTIMAL TRANSACTION NETWORK ON THE DETERMINED TRANSFER EXECUTION DATE

1002 — IDENTIFY FUND VALUE AND RECEIPT DATE OF ELECTRONIC TRANSACTION REQUEST (ETR)

1004 — IDENTIFY SETTLEMENT DATE FUNDS NEED TO BE IN A RECIPIENT ACCOUNT

1006 — DETERMINE FUND PROCESSING EXECUTION DATE AND OPTIMAL TRANSACTION NETWORK THROUGH WHICH TO PROCESS FUNDS

1008 — FACILITATE FUNDS TRANSFER TO RECIPIENT ACCOUNT ON EXECUTION DATE VIA OPTIMAL TRANSACTION NETWORK

SYSTEMS AND METHODS FOR EXECUTING REAL-TIME ELECTRONIC TRANSACTIONS BY A DYNAMICALLY DETERMINED TRANSFER EXECUTION DATE

TECHNICAL FIELD

The present disclosure relates generally to the field of electronic transactions and, more particularly, to systems and methods for executing real-time electronic transactions across multiple networks using a single platform.

BACKGROUND

Businesses, merchants, consumers, financial entities, and/ or government entities may perform electronic fund transfers, payment processing (e.g., e-commerce payments), capital management, etc. domestically and internationally over various payment networks. However, many aspects of the existing electronic payment/fund transaction technology involve some inherent deficiencies or shortcomings that may lead to poor user experience, increased time and costs, and other inconveniences when sending payments electronically across various payment networks. For example, many legacy payment processing networks involve a patchwork of processing systems, fragmented systems, security risks, and the like. The present disclosure is directed to addressing these and other drawbacks to the existing electronic transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In summary, one aspect provides a method of executing an electronic transaction by a real time transaction system, the method including: receiving, at an application programing interface (API) system, an electronic transaction request from a user on a receipt date; identifying, using a processor of the API system, a value associated with the electronic transaction request and a threshold settlement date by which the electronic transaction request is required to be processed to a recipient account; comparing, based on the identifying, the value to a predetermined threshold; ascertaining, based on the comparing, at least one transaction network certified to process the electronic transaction request; projecting, using the processor, a processing time for each of the ascertained at least one transaction network; determining, based on comparison of the processing time for each of the ascertained at least one transaction network to a timeline designated by the receipt date and the threshold settlement date, an optimal transaction network from the ascertained at least one transaction network and a transfer execution date; and facilitating, subsequent to the determining, processing of the electronic transaction request into the recipient account on the transfer execution date via the optimized transaction network.

Another aspect provides a real-time transaction system, including: one or more computer readable media storing instructions for executing a real-time electronic transaction; and one or more processors configured to execute the instructions to perform operations comprising: receiving, at an application programing interface (API) system, an electronic transaction request from a user on a receipt date; identifying, using a processor of the API system, a value associated with the electronic transaction request and a threshold settlement date by which the electronic transaction request is required to be processed to a recipient account; comparing, based on the identifying, the value to a predetermined threshold; ascertaining, based on the comparing, at least one transaction network certified to process the electronic transaction request; projecting, using the processor, a processing time for each of the ascertained at least one transaction network; determining, based on comparison of the processing time for each of the ascertained at least one transaction network to a timeline designated by the receipt date and the threshold settlement date, an optimal transaction network from the ascertained at least one transaction network and a transfer execution date; and facilitating, subsequent to the determining, processing of the electronic transaction request into the recipient account on the transfer execution date via the optimized transaction network.

A further aspect provides a non-transitory computer-readable medium storing instructions for executing a real-time transaction, the instructions, when executed by one or more processors, causing the one or more processors to perform operations including: receiving, at an application programing interface (API) system, an electronic transaction request from a user on a receipt date; identifying, using a processor of the API system, a value associated with the electronic transaction request and a threshold settlement date by which the electronic transaction request is required to be processed to a recipient account; comparing, based on the identifying, the value to a predetermined threshold; ascertaining, based on the comparing, at least one transaction network certified to process the electronic transaction request; projecting, using the processor, a processing time for each of the ascertained at least one transaction network; determining, based on comparison of the processing time for each of the ascertained at least one transaction network to a timeline designated by the receipt date and the threshold settlement date, an optimal transaction network from the ascertained at least one transaction network and a transfer execution date; and facilitating, subsequent to the determining, processing of the electronic transaction request into the recipient account on the transfer execution date via the optimized transaction network.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 7 illustrates a flowchart of another exemplary method of executing an electronic transaction, according to one aspect of the present disclosure.

FIG. 9 illustrates a flowchart of another exemplary method of executing an electronic transaction, according to one aspect of the present disclosure.

DETAILED DESCRIPTION OF EMBODIMENTS

Figure 1:
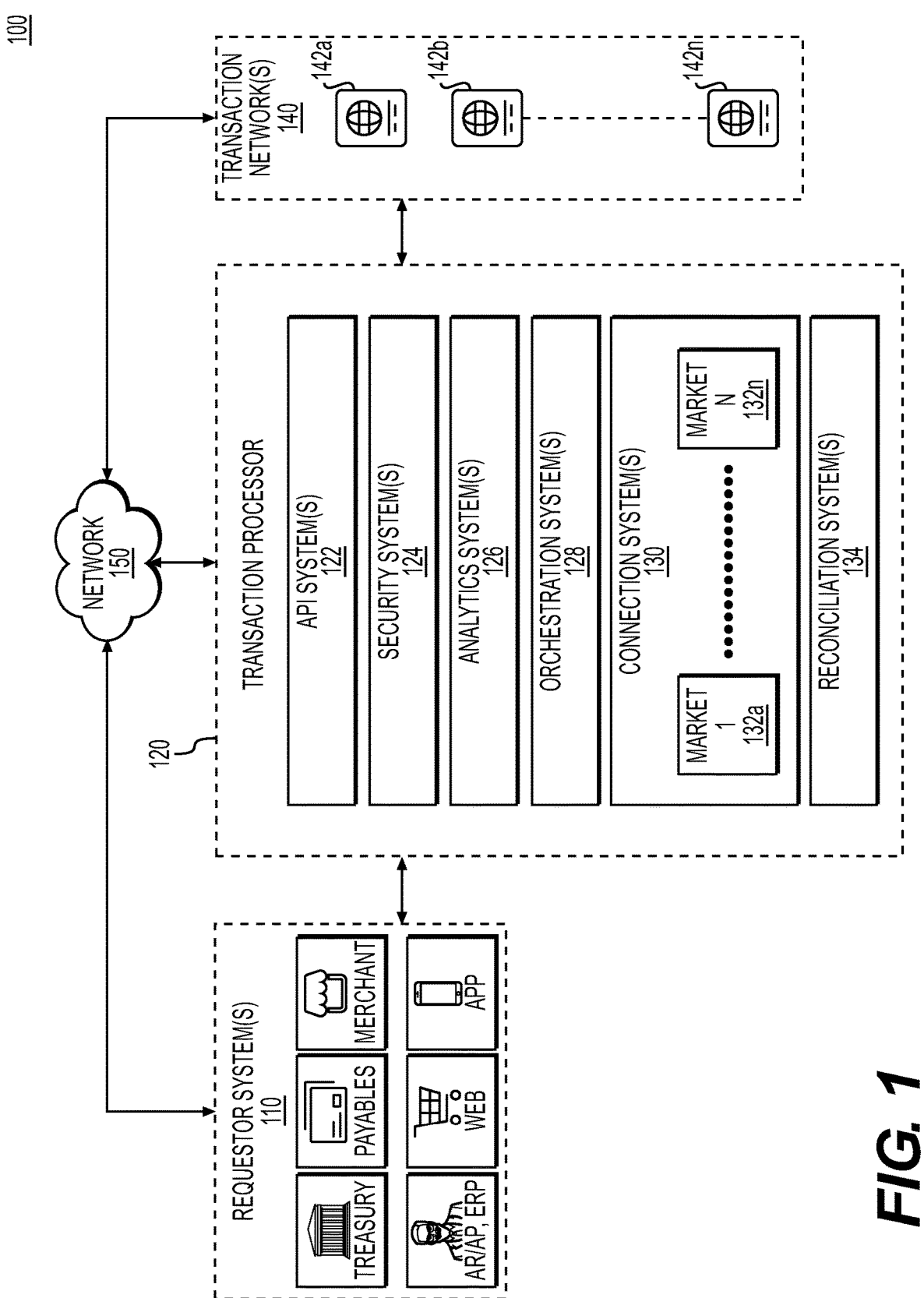
FIG. 1 depicts a block diagram of an exemplary electronic transaction system, according to one aspect of the present disclosure.

The following embodiments describe systems and methods for facilitating electronic transactions. More particularly, the embodiments contemplated in the present disclosure may enable merchants, customers, businesses, institutions, etc. to utilize a single transaction processor that may communicate with transaction requestors and transaction networks in order to facilitate various electronic transactions.

As discussed above, various aspects of the existing electronic payment technology involve certain drawbacks and deficiencies in executing payment transactions domestically and/or internationally. For example, the patchwork of complex legacy systems and evolving solutions, the maze of compliance standards across various markets and payment methods, and arbitrary transaction pricing strategies may lead to slow and unreliable transactions as well as increased costs and poor user experience.

Furthermore, conventional systems are largely reliant on explicit user delineations and may therefore be more prone to user error. More particularly, many users may be unable to identify which transaction network is optimal to process a particular electronic transaction and/or by which date the electronic transaction needs to be executed in order for the funds associated with that electronic transaction to be deposited/settled into a recipient account (e.g., by a predetermined time as designated by an owner of the recipient account, etc.). In these situations, identifying the optimal transaction network and critical transaction execution date may be time-consuming and burdensome, especially if the user is largely unfamiliar with the regulations and technicalities associated with electronic transactions.

To address the above-noted problems, the present disclosure describes systems and methods that provide a unified platform that facilitates or provides, for example: 1) a singular application programming interface (API) to all account-to-account payment methods; 2) managing consistent and globally accepted security and privacy practices; 3) intelligent payment routing and orchestration capabilities; 4) unified reconciliation and reporting across payment methods and schemes; and 5) a single management portal which may provide management of an entire customer lifecycle. For example, a transaction processor including an API system(s), a security system(s), an analytics system(s), an orchestration system(s), a connection systems(s), and a reconciliation system(s) may communicate with a requestor system(s) and transaction network(s) to facilitate and execute electronic transactions of the present disclosure.

In one embodiment, the transaction processor of the present disclosure may receive, via the API system, an electronic transaction request (e.g., an account-to-account fund transfer, purchase payment, reimbursements, etc.) from a user (e.g., a business, merchant, consumer, financial institutions, government institutions, etc.). The API system may then transmit the electronic transaction request to the choreographer system of the transaction processor. The choreographer system may then transmit a validation API call, which may be based on the electronic transaction request, to an account system of the transaction processor. The account system may then determine whether an account associated with the payment request system exists in a transaction processor database. Further, the choreographer system may transmit an authorization API call, which may be based on the electronic transaction request, to an authorization system of the transaction processor. The choreographer system may then receive an authorization response from the authorization system. Furthermore, the choreographer system may transmit an electronic transaction request at least one of a routing system, an account ledger system, an auditing system, and/or a transaction system of the transaction processor. The routing system may perform intelligent routing of the transaction request to optimize the transaction request routing based, for example, on the user preferences.

It should be appreciated that particular consideration is made herein to payment transactions relating to businesses, merchants, and/or consumers. Despite this reference to payment transactions relating to businesses, merchants, and or consumers, certain disclosed systems and methods may apply equally well to various other e-commerce and electronic transactions. Effectively, any circumstance where credit, currency, crypto currency, collateralized funds, smart contracts, and/or tokenized funds thereto, is being transmitted over a network, systems and methods disclosed herein may be employed. Further, while the party seeking to initiate an electronic transaction and/or provide a third-party service may be referred to herein as a business, a merchant, or a consumer, a party seeking to initiate an electronic transaction need not be a business, a merchant, or a consumer, but may be a financial institution, a government institution, a service provider, a user, or any party seeking to execute an electronic transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a requestor system(s) 110, a transaction processor 120, and a transaction network(s) 140. The requestor system(s) 110, the transaction processor 120, and the transaction network(s) 140 may be in communication with each other directly, indirectly, and/or via a network 150 (e.g., the Internet and/or one or more cloud networks). The requestor system(s) 110, the transaction processor 120, and the transaction network(s) 140 may also be in communication with each other directly via direct lines of communication, via combinations of physical, technological, and/or business relationships. The requestor system(s) 110 may include one more entities, for example, but not limited to, treasury, merchants, consumers, businesses, financial institutions, government institutions, etc. The requestor system(s) 110 may transmit, for example, a request to transmit electronic funds to one or more receivers.

In one embodiment, the requestor system(s) 110 may be configured to facilitate a business requesting to transmit electronic funds to a consumer. In this embodiment, the electronic funds may include, for example, legal settlements, insurance claims, shareholder dividends, loyalty payments, loans, investment disbursements, customer refund pay-outs, etc. In another embodiment, the requestor system(s) 110 may be configured to facilitate a business requesting to transmit electronic funds to another business. In this embodiment, the electronic funds may include, for example, accounts receivables/payables (AR/AP), rent payments, business loan payments, payroll, bank-to-bank cross border payments, supplier payments, freelancer disbursements, supply chain finance disbursements, business medical benefits disbursements, affiliate marketing programs disbursements, etc. In another embodiment, the requestor system(s) 110 may be configured to facilitate a consumer requesting to transmit electronic payments to a business (or a merchant). In this embodiment, the electronic payments may include, for example, payments at point of sale terminals, payments at eCommerce checkouts, online marketplace payments, online digital content payments, sports wagering payments, telecommunication bill payments, utilities payments, rent payments, investment payments, etc. In another embodiment, the requestor system(s) 110 may be configured to facilitate a user (e.g., any individual or consumer) requesting to transmit electronic funds to another user. In this embodiment, the electronic funds may include, for example, crowdfunding payments, mobile wallet payments, gift payments, person-to-person payments, account-to-account transfers, etc. In another embodiment, the requestors system(s) 110 may be configured to facilitate a government entity requesting to transmit electronic funds to a consumer. In this embodiment, the electronic funds may include, for example, government benefits payments, student aid payments, tuition payments, tuition reimbursement payments, etc. In another, the requestors system(s) 110 may be configured to facilitate a user or consumer requesting to transmit electronic payments to a government entity. In this embodiment, the electronic funds may include, for example, transit payments, parking payments, tax payments, permit payments, payroll payments, etc.

In one embodiment, the requestor system(s) 110 may utilize an integration portal (or platform) and/or integration services provided by the transaction processor 120 for integrating user experience and/or user interfaces (e.g., AR/AP, Enterprise Resource Planning (ERP) system, a website, an app, etc.) for interacting with the transaction processor 120. In some embodiments, the requestor system(s) 110 may be integrated with the transaction processor 120 by using integration tool kits/services and/or a do-it-yourself (DIY) model utilizing the API system(s) 122 of the transaction processor 120.

Still referring to FIG. 1, the transaction processor 120 may include an application programming interface (API) system(s) 122 (e.g., an API gateway), a security system(s) 124, an analytics system(s) 126, an orchestration system(s) 128, a connection system(s) 130, and a reconciliation system(s) 134. The connection system(s) 130 may be configured to communicate with various markets domestically and/or internationally (e.g., Markets 1-N 132a-132n). The transaction processor 120 may be configured to facilitate electronic transactions and communications between the requestor system(s) 110 and the transaction network(s) 140. For example, the API system(s) 122 may receive one or more requests to transfer funds (or payments) electronically from the requestor system(s) 110 via an API (e.g., a representational state transfer (RESTful), real-time API, or file-based batch API) of the transaction processor 120. The batch API (or API) may be accessed over one or more public Secure File Transfer Protocol (SFTP) endpoints. The RESTful API (or API) may be accessed over one or more public Hypertext Transfer Protocol Secure (HTTPS) endpoints. The API may include capabilities to create customer identities in the transaction processor 120, associate bank accounts to the customer identities, and make payments between multiple accounts. The API system(s) 122 may communicate with the security system(s) 124, analytics system(s) 126, and the orchestration system(s) 128 to execute the electronic transactions of the present disclosure. For example, the API system(s) 122 may transmit the electronic fund transfer (or payment) requests to the orchestration system(s) 128. The orchestration system(s) 128 may then transmit the electronic payment requests to appropriate networks or schemes in the transaction network(s) 140 via the connection system(s) 130. (Further described later in detail below.) Additionally, the reconciliation system(s) 134 may receive notifications, messages, and/or acknowledgements from the transaction network(s) 140, and may transmit appropriate messages, alerts, and/or signals associated with the electronic fund transfer request to the requestor system(s) 110 in real-time.

The transaction processor 120 may be a single processor utilizing a single API domestically and/or internationally across the globe. That is, the transaction processor 120 may facilitate account-to-account real-time electronic transactions (e.g., electronic payments, funds transfer, currency exchange, reimbursement, asset managements, etc.) by establishing a client centric platform that unifies, orchestrates, and executes electronic transactions domestically and/or internationally. Moreover, the transaction processor 120 may be configured to execute electronic fund transfers, currency exchange transactions, tokenization, and/or electronic transaction authorizations within the single platform. Further, the transaction processor 120 may be configured to operate consistently, in accordance with globally accepted security and privacy practices. Furthermore, the transaction processor 120 may be configured to perform intelligent payment routing via the orchestration system(s) 128 in real-time based on user (e.g., the requestor system(s) 110) preferences. In some embodiments, the user may make changes to transaction routing preferences (e.g., time and costs of completing payment transactions) in real-time. The transaction processor 120 of the present disclosure may provide, among other things, a single partner accountability, cost reduction, improved cash flow, increased payment security, improved access to payments, and better insight and accountability of payments/funds. Thus, the transaction processor 120 may be a one-stop shop for executing payments transactions.

Still referring to FIG. 1, the transaction network(s) 140 may include one or more networks or schemes 142a, 142b-142n. The one or more schemes (or networks) 142a-142n may include, for example, an Automated Clearing House (ACH) networks (e.g., ACH, Same Day ACH, etc.), Card networks (e.g., American Express, Discover, MasterCard, Visa, etc.), Real Time Payment (RTP) networks (e.g., the Clearing House, etc.), blockchain networks, wire transfer networks, Faster Payments network, Bankers' Automated Clearing System (Bacs) Payment Schemes, the Clearing House Automated Payment System (CHAPS) network, Single Euro Payments Area (SEPA) network, SEPA Instant Credit Transfer (SCT Inst) network, and/or other financial platform networks (e.g., Dwolla, PayPal, Western Union, Currencycloud, TransferMate, etc.). The transaction network(s) 140 may complete or reject the electronic fund transfer request upon authenticating and/or authorizing the electronic fund transfer request in accordance with the established policies and/or rules of one or more of the schemes 142a, 142b-142n.

Figure 2:
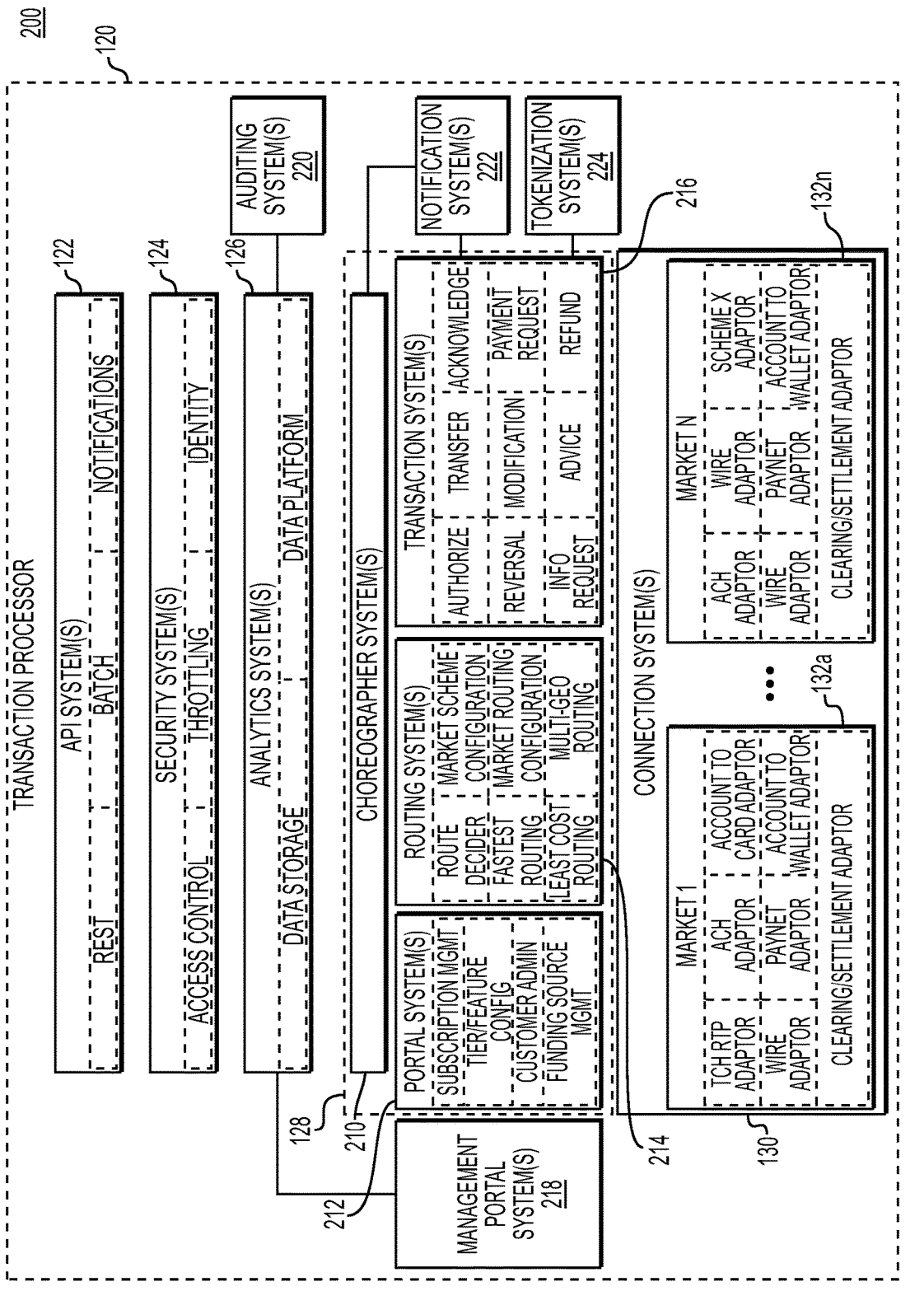
FIG. 2 depicts a block diagram of another exemplary electronic transaction system, according to one aspect of the present disclosure.

FIG. 2 depicts an exemplary system 200 including the transaction processor 120. Specifically, the portion depicted in FIG. 2 represents a more detailed example illustration of the transaction processor 120, but which should not be construed as limiting transaction processor 120. The transaction processor 120 may include one or more of the API system(s) 122, the security system(s) 124, the analytics system(s) 126, the orchestrating system(s) 128, a management portal system(s) 218, an auditing system(s) 220, a notification system(s) 222, and a tokenization system(s) 224. The API system(s) 122 may facilitate communications with the requestor system(s) 110, transaction network(s) 140, and between one or more systems (or microservices) of the transaction processor 120 depicted in FIG. 2. For example, the API system(s) 122 may utilize APIs (e.g., internal or external APIs), batch APIs, and/or notification APIs in order to facilitate the execution of the electronic transactions of the present disclosure. In one embodiment, the RESTful API of the API system(s) 122 may be accessed over one or more public Hypertext Transfer Protocol Secure (HTTPS) endpoints. The API system(s) 122 may utilize, for example, POST, GET, and PUT methods to execute and facilitate the electronic transactions of the present disclosure. In another embodiment, the batch API of the API system(s) may be accessed over one or more public Secure File Transfer Protocol (SFTP) endpoints.

Still referring to FIG. 2, the security system(s) 124 may facilitate, for example, user (or customer) access control, user throttling, and/or user identification. In one embodiment, the security system(s) 124 may ensure that the transaction processor 120 is in compliance with one or more data protection standards. One or more data elements of the transaction processor 120 may be monitored in order to meet the one or more encryption standards established by the transaction processor 120. For example, data elements, such as, personally identifiable information (PII), payment card data (PCI data), authentication credentials, other sensitive data, company confidential data, etc. may be monitored by the security system(s) 124.

In one embodiment, the security system(s) 124 may facilitate and manage the encryption of data and/or keys associated with the electronic transactions of the present disclosure. For example, the security system(s) 124 may include a key management service (KMS) that may establish a time-limit for the life of an encryption key. The KMS may be managed internally or externally (e.g., Amazon Web Service Key Management Service (AWS KMS)) from the transaction processor 120. In one embodiment, once an encryption key exceeds its lifespan, the encryption key may be deleted from an encryption key cache in the transaction processor 120. The encryption key may then be replaced with a newly generated key by the KMS. This functionality may provide compliance with a data key rotation policy that may be established by the transaction processor 120, for example, by setting a cache expiration that is within the data key rotation policy limits. Further, access to the keys in the KMS may be limited by the access control of the security system(s) 124 and may be assigned with least-privilege.

In one embodiment, the security system(s) 124 may be configured to give access to users to call operations against KMS Customer Master Key (CMK) with only the designated service and/or user identities. The security system(s) 124 may also audit the use and access of the master keys. Further, the security system(s) 124 may utilize a secure hash function (e.g., Secure Hash Algorithm-256 (SHA-256)) for data elements that are encrypted but also must be searched on. Since there may be cases where the hashed data elements (e.g., Sender name, Sender account number, Sender routing number, Receiver Name, Receiver account number, Receiver routing number, etc.) may be searched across all tenants, hashed data elements may have a global salt. In one embodiment, sensitive data elements that are at rest may be stored in the transaction processor 120 using Advanced Encryption Standard (AES)-256. Also, any message data in motion may be protected by enforcing a minimum of Transport Layer Security (TLS) 1.2.

Still referring to FIG. 2, the analytics system(s) 126 may comprise a data storage (e.g., a data lake) and a data platform for performing analytics. For example, the auditing system(s) 220 and the management portal system(s) 218 may be in communication with the analytics system(s) 126 in order to perform analysis and auditing on the electronic transactions of the present disclosure. The auditing system(s) 220 may subscribe to transaction event topics and transmit the event topics to a data lake for analytics. The management portal system(s) 218 may facilitate onboarding, configuration, and certification for the users of the transaction processor 120. The management portal system(s) 218 may provide self-service functionality for the users of the transaction processor 120 as well as administrative functionality for the internal support teams of the transaction processor 120.

Still referring to FIG. 2, the orchestration system 128 may include a choreographer system(s) 210, a portal system(s) 212, a routing system(s) 214, and transaction system(s) 216. The choreographer system(s) 210 may be configured to choreograph the steps required to process one or more real-time electronic transaction requests or one or more real-time transaction inquiries of the present disclosure. For example, the choreographer system(s) 210 may be configured to verify whether a transaction requestor (e.g., requestor system(s) 110) has permission to request transactions and/or inquiries. For example, the choreographer system(s) 210 may make an internal API call to an authorization system of the transaction processor 120.

In one embodiment, the choreographer system(s) 210 may facilitate execution of electronic funds transfer requests (or payment requests). For example, the choreographer system(s) 210 may make an internal API call to an account validation query system of the transaction processor 120 to validate whether the source account exists. The account validation query system may verify the formatting of the source and destination account. Further, the choreographer system(s) 210 may be configured to make internal API calls to an authorization system of the transaction processor 120 to verify that the user has permissions to perform payment using the specified source account. In one embodiment, the choreographer system(s) 210 may be configured to post a payment request to event-topic stream (e.g., Kafka) transactions. The choreographer system(s) 210 may be configured to respond back to an external API caller that the payment request has been accepted for processing.

In one embodiment, the choreographer system(s) 210 may be configured to process transaction inquiries in real-time. For example, the choreographer system(s) 210 may make internal API calls to the transaction query system to perform transaction lookups. Further, the choreographer system(s) 210 may make internal API calls to the authorization system to verify whether the user has permissions to view the transaction and associated accounts. Additionally, the choreographer system(s) 210 may respond back to an external API call through the API system(s) 122 with the inquiry response.

Still referring to FIG. 2, the portal system(s) 212 may be configured to facilitate, for example, subscription management of users (or customers) or developers, tier and feature configurations, customer administration, funding source managements, etc. The portal system(s) 212 may allow the developers or users of the requestor system(s) 110 to initiate transactions or payment requests, transmit transaction status, receive notifications, etc. in real-time. The portal system(s) 212 may be configured to facilitate or provide an integration portal that may include, for example, a unified developer portal (e.g., sandbox interface) that the developers may utilize in order to integrate the requestor system(s) 110 with the transaction processor 120. The integration portal may enable the developers to configure the request system(s) 110 to access, communicate with, and utilize the functionalities of the transaction processor 120. In some embodiments, the integration portal may include an interactive marketing platform of the transaction processor 120. The marketing platform may provide, for example, demonstration sections of how payments happen and what happens in the backend of the transaction processor, as well as various use cases for accessing, communicating with, and utilizing the functionalities of the transaction processor 120. Thus, the integration portal may achieve seamless integration of the requestor system(s) 110 with the transaction processor 120 via the marketing portal and the integration portal.

In one embodiment, the integration portal may include live connections to the APIs of the transaction processor 120, code snippets for communicating with the transaction processor 120, and a certification interface for certifying the APIs used for communicating with the transaction processor 120. The code snippets may be provided in different languages and in real-time. For example, changing the RTP scheme to a different scheme may be achieved by editing the snippets in a live sandbox environment. Further, the integration portal may provide Uniform Resource Locator (URL) links to the developers to allow using a common API by following the provided links and integrating with the transaction processor 120 easily and intuitively without having to store any separate URLs. Furthermore, the transactions may be updated in real-time via the integration portal. For example, payment rails may be changed based on the due date, the ability to cancel payments, etc. Additionally, the integration portal may provide notifications regarding the transaction that the users can access and see without having to email or call.

Still referring to FIG. 2, the routing system(s) 214 may facilitate route deciding, fastest routing, least cost routing, market scheme configuration, market routing configuration, multi-geo routing, etc. The routing system(s) 214 may execute transaction routing by looking at both customer configuration and scheme capabilities. The data associated with price, speed, and capability across both the customer and schemes may be utilized to identify the best possible route for the electronic transactions depending upon configuration for a specific customer and whether the customer has a speed versus cost processing preference. The routing system(s) 214 may utilize an open-source business rule management system (BRMS) (e.g., Drools) to implement the routing decision models. The routing system(s) 214 may be configured to facilitate and choreograph the steps required to route and execute payment requests. The routing system(s) 214 may subscribe to transaction even topics and may act on payment initiated events to initiate routing requests. In one embodiment, the routing system(s) 214 may make internal API calls to an entitlement query system(s) to retrieve customer specific configuration details that may impact the route of the payment requests. The routing system(s) 214 may process transaction requests, including customer entitlement details, through a routing model to identify the appropriate payment scheme adapter (further described in more detail below). The routing system(s) 214 may make internal API calls to one or more payment scheme adapters, which then may call the market specific payment scheme implementation. Further, the routing system(s) 214 may publish route chosen events to a transaction event topic data stream.

Still referring to FIG. 2, the transaction system(s) 216 may be configured to facilitate, for example, electronic funds transfer requests, electronic funds transfer information request, electronic funds transfer advice, electronic funds transfer authorization, acknowledgement, reversal, modification, and refund, etc. The transaction system(s) 216 may be in communication with the notification or messaging system(s) 222. The notification system(s) 222 may receive notifications from the payment schemes (e.g., schemes 142a-142n) to provide status updates as a transaction moves thorough its lifecycle. The notifications from the payment schemes, along with the associated scheme details, may be received through the API system(s) 122. The notification system(s) 222 may respond to the notifications with acknowledgments. The notification system(s) 222 may then publish a payment notification received event to a payment notification topic. In one embodiment, the notification system(s) 222 may include a payment notification handler that subscribes to payment notification topics and await the payment notification received messages. That is, when an event is processed, the payment notification handler may first make an internal API call to a transaction query system(s) to retrieve additional details of the transaction associated with the payment notification. The payment notification handler may then publish to a payment notification topic, a payment acknowledgement message.

The connection system(s) 130 may include one or more adapters for communicating with the transaction network(s) 140. For example, the connection adapters for Market 1 132*a* may include a TCH RTP adapter, ACH adapter, account to card adapter, wire adapter, payment adapter, account to wallet adapter, clearing/settlement adapter, etc. Additionally or alternatively, the connection adapters for Market N 132*n* may similarly include, for example, ACH adapter, wire adapter, scheme adapter, wire adapter, paynet adapter, account to wallet adapter, clearing/settlement adapter, etc.

In one embodiment, the transaction system(s) 216 may receive information associated with the electronic transactions of the present disclosure and facilitate the execution of the electronic transactions. The transaction system(s) 216 may transmit the transaction information to the tokenization system(s) 224. The tokenization system(s) 224 may then generate tokens to use surrogate values for the sensitive account details used for payment transactions requested by the requestor system(s) 110. A token may be a low-value token or a high-value token. Further, a token may be a randomly generated number. In other embodiments, a token may be a pseudorandom number, encrypted information, or other character sequence.

The transaction processor 120 may be deployed to servers and data centers in multiple regions and availability zones. The transaction processor 120 may be cloud-native and cloud-agnostic utilizing containerized microservices and may be deployed to an elastic infrastructure on an open-source container-orchestration system (e.g., Kubernetes). In one embodiment, the transaction processor 120 may be deployed and built completely in cloud. Thus, the complexity of the transaction processor 120 may be contained by building ground-up with cloud-based microservices design (e.g., AWS Cloud infrastructure). The cloud-based microservices design of the present disclosure may allow quick enhancements and elastically scaling the transaction processor 120 without customer impact or downtime. For example, small teams of developers may quickly add enhancements and new scheme supports. Also, failures may be contained and may prevent collateral damage to other functionality.

Figure 3:
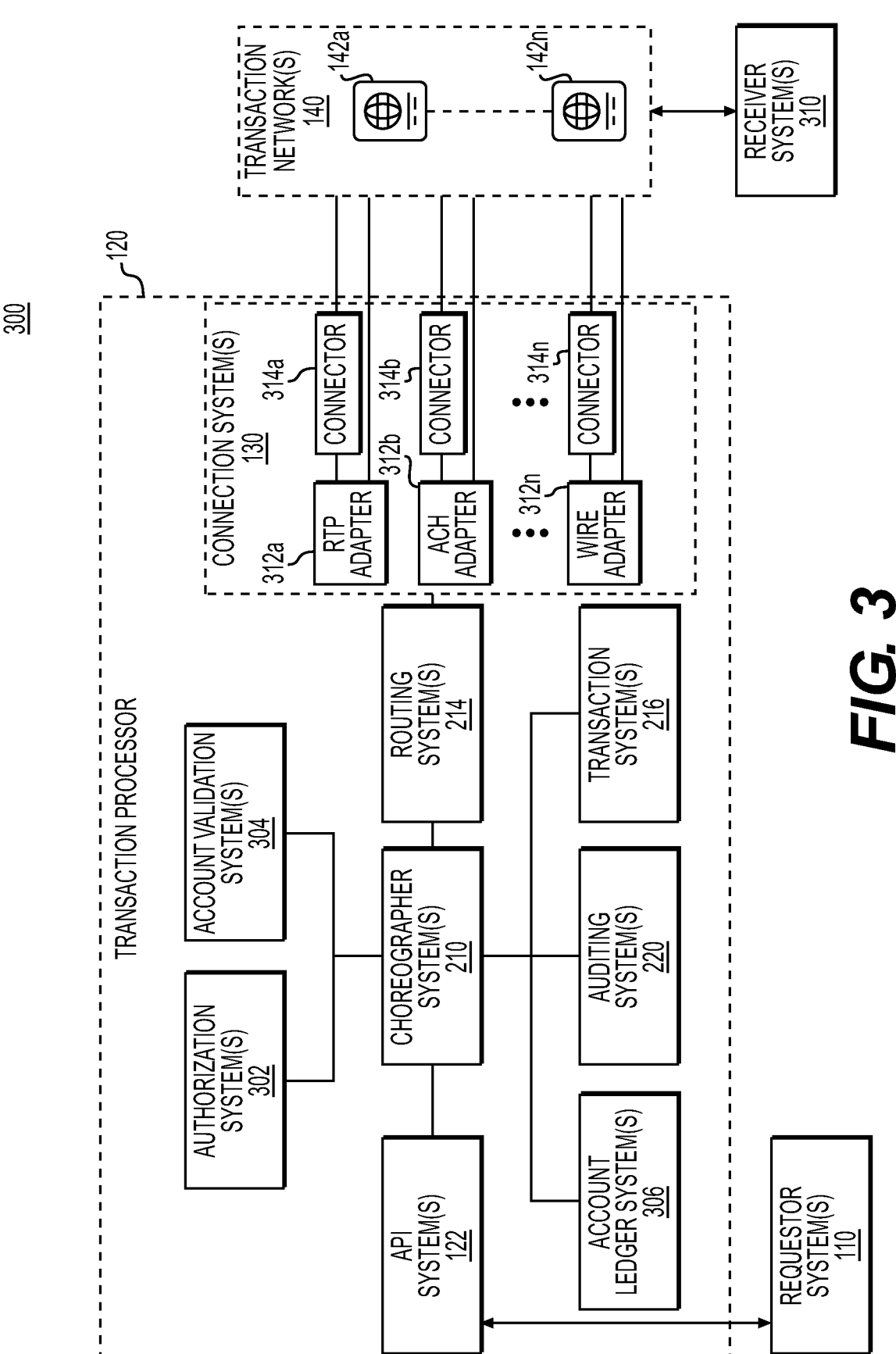
FIG. 3 depicts a block diagram of another exemplary electronic transaction system, according to one aspect of the present disclosure.

FIG. 3 depicts an exemplary system 300 for facilitating an electronic transaction request (e.g., a payment request) of the present disclosure. The system 300 may include, for example, the requestor system(s) 110, the transaction processor 120, the transaction network(s) 140, and the receiver system(s) 310. In this embodiment, the transaction processor 120 may include, further to the systems depicted in FIG. 3, one or more systems or microservices. For example, the transaction processor 120 may include an authorization system(s) 302, an account validation system(s) 304, an account ledger system(s) 306, and an auditing system(s) 220, which may be in in communication with the choreographer system(s) 210. In this embodiment, the connection system(s) 130 may include one or more scheme or network adapters. For example, the connections system(s) 130 may include an RTP adapter 312*a*, an ACH adapter 312*b*, a wire adapter 312*n*, etc. Further, the connection system(s) 130 may include connectors 314*a-n* that may be configured to facilitate communication with the transaction network(s) 140.

Still referring to FIG. 3, the authorization system(s) 302 may expose an internal API that may be called by other systems or microservices within the transaction processor 120 to verify that a user has access to perform operations and view data. The account validation system(s) 304 may exposes an internal API that may be called by other systems or microservices within the transaction processor 120 to perform inquiries against account details stored in a transaction processor database (not shown in the figure). The account ledger system(s) 306 may expose an internal API that may be called by other systems or microservices within the transaction processor 120 to perform inquiries against account ledger details stored in the database of the transaction processor 120. The account ledger system(s) 306 may subscribe to the transaction event topics of Kafka streams transmitted by the choreographer system(s) 210 in accordance with the present disclosure. Further, the account ledger system(s) 306 may watch for complete states and may use these events to update the ledger database. In one embodiment, the auditing system(s) 220 may subscribe to the transaction event topics of Kafka streams transmitted by the choreographer system(s) 210. The auditing system(s) 220 may transmit these events to a data lake for analytics.

Still referring to FIG. 3, the transaction system(s) 216 may expose an internal API that may be called by other systems or microservices within the transaction processor 120 to perform inquiries against account details stored in a Not Only Structured Query Language (NoSQL) database provided by the transaction processor 120. As described in reference to FIG. 2, the routing system(s) 214 may be responsible for choreographing the steps required to route and execute payment requests. The routing system(s) 214 may subscribe to the transaction event topics of Kafka streams transmitted by the choreographer system(s) 210 and may act on payment initiated events to initiate routing requests. The routing system(s) 214 may make an internal API call to the Entitlement Query Service to retrieve customer specific configuration details that may impact the route. The routing system(s) 214 may process the request, including the customer entitlement details, through the routing model to identify the appropriate payment scheme adapter.

Still referring to FIG. 3, the RTP adapter 312*a* may expose an internal API for processing payments across RTP schemes or rails. The RTP scheme adapter 312*a* may call into the internal/external market specific API RTP rail implementation. The ACH adapter may expose an internal API for processing payments across ACH rails. The ACH adapter 312*b* may call into the internal/external market specific API ACH rail implementation. The wire adapter 312*n* may expose an internal API for processing payments across wire rails. The wire adapter 312*n* may call into the internal/external market specific API wire rail implementation.

In one embodiment, incoming payment requests (e.g., a payment request API) from users (e.g., a payment sender) in the requestor system(s) 110 may be managed by the API system(s) 122. The API system(s) 122 may execute an authentication check of the user identify (e.g., via an Open Authorization 2.0 (OAuth2)) by communicating with an identity provider (IdP) of the transaction processor 120. The API system(s) 122 may then forward the payment request to the payment choreograph system(s) 210. The choreographer system(s) 210 may then initiate an authorization check with the authorization system(s) 302. Once authorization system(s) 302 verifies the requestor system(s) 110 has permission to perform the transaction, the choreographer system(s) 210 may communicate with the account validation system(s) 304 to check whether the user in requestor system(s) 110 exist in a database of the transaction processor 120. The choreographer system(s) 210 may then stream Kafka messages that may be received by the account ledger system(s) 306, auditing system(s) 220, transaction system(s) 216, and the routing system(s) 214.

Still referring to FIG. 3, the routing system(s) 214 may forward the payment request to the optimal scheme (or rail) adapter in the connection system(s) 130. The connection system(s) 130 may then transmit the payment request to the appropriate scheme (e.g., schemes 142a-142n) in the transaction network(s) 140. In one embodiment, a third-party service provider may directly implement one or more adapters provided by the connection system(s) 130. Thus, the transaction processor 120 may not be required to integrate to the third-party service provider API.

Figure 4:
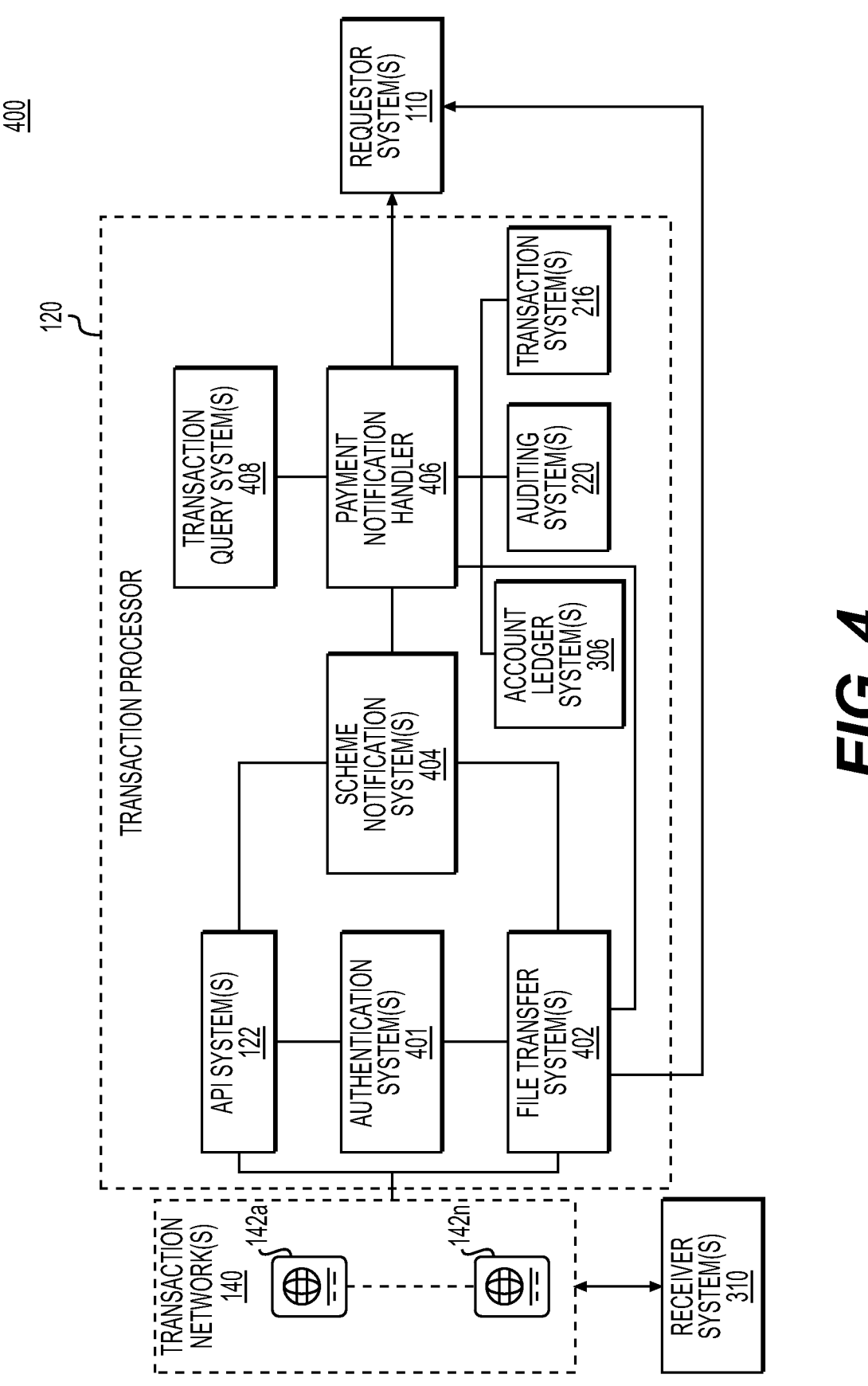
FIG. 4 depicts a block diagram of another exemplary electronic transaction system, according to one aspect of the present disclosure.

FIG. 4 depicts an exemplary system 400 for facilitating transaction reconciliation and notification of the present disclosure. The system 400 may include, for example, the requestor system(s) 110, the transaction processor 120, the transaction network(s) 140, and a receiver system(s) 310. In this embodiment, the transaction processor 120 may include, further to the systems depicted in FIGS. 3 and 4, an authentication system(s) 401, a file transfer system(s) 402, a scheme notification system(s) 404, a payment notification handler 406, and a transaction query system(s) 408. In one embodiment, the authentication system(s) 401 may authenticate APIs using an OAuth2 protocol against an identity provider (IdP) of the transaction processor 120. Further, the authentication system(s) 401 may authenticate username and password for accessing the portal system(s) 212. In one embodiment, the scheme notification system(s) 404 may translate scheme specific notifications into a generic non-scheme specific format. The file transfer system(s) 402 may aggregate the notifications received from the schemes 142a-142n into a file and send to the receiver system(s) 310 based on the configured preferences. The transaction query system(s) 408 may expose an internal API that may be called by other systems or microservices of the transaction processor 120 to perform inquiries against account details stored in the NoSQL database. Further, the transaction query system(s) 408 may subscribe to transaction event topics from the Kafka streams of the transaction processor 120 and may utilize these events to update the NoSQL database. In one embodiment, the payment notification handler 406 may subscribe to payment notification topics and await the payment notification received messages. That is, when an event is processed, the payment notification handler 406 may first make an internal API call to a transaction query system(s) 408 to retrieve additional details of the transaction associated with the payment notification. The payment notification handler 406 may then publish to a payment notification topic, a payment acknowledgement message.

In one embodiment, the schemes 142a-142n in the transaction network(s) 140 may provide transaction updates to the transaction processor 120 as a transaction is processed. The updates may be received by the API system(s) 122 or as batch files (Secure Fil Transfer Protocol (SFTP) push or pulls) handled by the file transfer system(s) 402. The updates may also be authenticated by the authentication system(s) 401 to validate the sender of the updates. Upon successful validation, the updates may then be routed to the scheme notification system(s) 404. The scheme notification system(s) 404 may translate the scheme specific notification into a generic non-scheme specific format. The generic message may be pushed onto the Kafka message que and may be received by the payment notification handler 406. The payment notification handler 406 may call the transaction query system(s) 408 to retrieve the transaction details from a database of the transaction processor 120. The payment notification handler 406 may then transmit a Kafka message to the account ledger system(s) 306, auditing system(s) 220, and the transaction system(s) 216, and/or the file transfer system(s) 402. The file transfer system(s) 402 may aggregate the notifications into a file. The notification file may then be sent to the receiver system(s) 310 based on the configured preferences (e.g., a Webhook to the configured HTTPs endpoint, an SFTP push to the configured SFTP endpoint, and/or an SFTP pull form the receiver system(s) 310 to an SFTP server of the transaction processor. Thus, the reconciliation and notification aspects of the present disclosure may provide a real-time status of the payment to the requestors system(s) 110, allowing the transaction requestors to always know where the payment stands.

Figure 5:
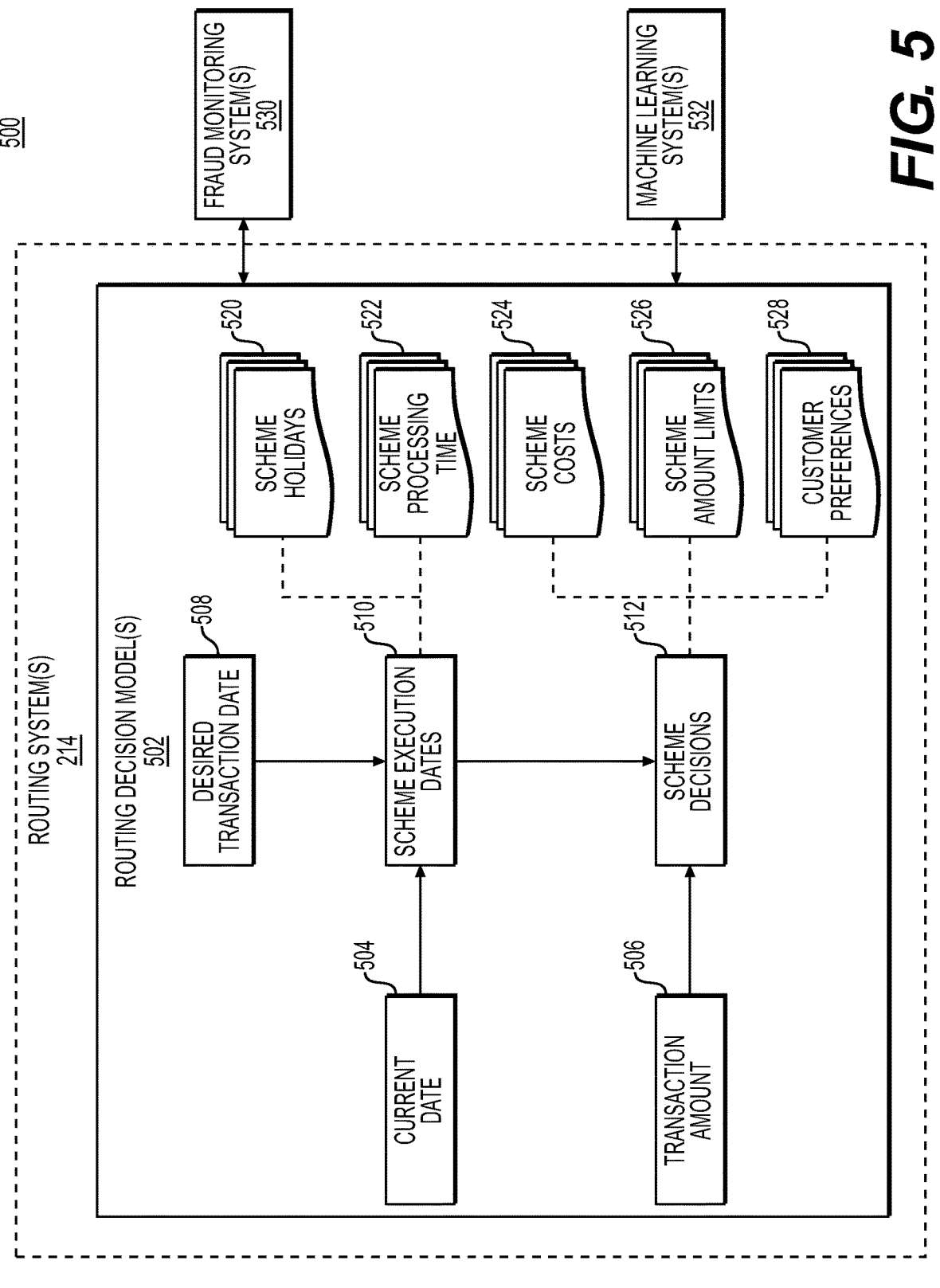
FIG. 5 depicts a block diagram of another exemplary electronic transaction system, according to one aspect of the present disclosure.

FIG. 5 depicts an exemplary system 500 for facilitating a transaction routing of the present disclosure. The system 500 may include, the routing system(s) 214, a fraud monitoring system(s) 530, and a machine learning system(s) 532. In this embodiment, the routing system(s) 214 may include a routing decision model(s) 502. In one embodiment, the routing system(s) 214 may perform transaction routing by looking at both customer configurations and scheme capabilities. That is, the routing system(s) 214 may consider price, speed, and capability facts across both the customers and the schemes (e.g., schemes 142a-142n) and may identify the best possible route for the transaction. The route for the transaction may be determined based on the configurations or preferences of a customer (e.g., speed versus cost processing preference). In one embodiment, the routing decision model(s) 502 may utilize at least the following data to determine an optimal path for executing the electronic transactions (e.g., payment request) of the present disclosure: current date 504, transaction amount 506, desired transaction date 508, scheme execution dates 510, scheme decisions 512, scheme holidays 520, scheme processing time 522, scheme costs 524, scheme amount limits 526, and customer preferences 528. The optimal path for executing, for example, a payment request, may be based on the user's (or client's) desired preferences. In one embodiment, the routing decision model(s) 502 may consider, for example, two key inputs: transaction amount 506 and desired transaction date 508. That is, the routing decision model(s) 502 may factor in customer preferences and business knowledge to make decisions on the transaction schemes 142a-142n and scheme execution dates 510, as further described below with reference to FIG. 8.

In one embodiment, one or more routing criteria may be considered by the routing decision model(s) 502 to determine the optimal transaction routes. For example, with respect to geography, the following questions, for example, may be considered: 1) Is this a U.S. domestic transaction?, 2) Is this a U.K. domestic transaction? 3) Is this cross-border?, and so on. Each option may affect or change the available routes and influence the decisioning processes of the routing decision model(s) 502. Regarding the scheme holidays 520 and the transaction processing time 522, unlike the RTP scheme, for example, other schemes or rails may take days to process a transaction. In order ensure that a transaction gets processed on time, the processing time must be calculated and trace back to ensure any non-processing windows like a weekend or a bank holiday are not ignored. Regarding the scheme (or rail) costs 524, the costs may vary from rail to rail. As such, depending on the customer preference, the transactions may be routed through the cheapest route. Regarding the scheme amount limits 526, a transaction may exceed a particular rail's maximum allowed threshold. In such a case, the routing decision model(s) 502 may not consider that particular route option or potentially split a transaction across multiple payment rails. The rules built by the routing decision model(s) 502 may be configurable, for example, at different hierarchies: global system-wide rules; rules particular to a payment scheme; and customized client specific rules. Beyond the rules-based routing inputs, the routing system(s) 214 may take real-time feedback from the fraud monitoring system(s) 530. That is, based on a fraud profiling conducted by the fraud monitoring system(s) 530, a transaction may be to a different rail. For example, a risky transaction may be moved from an RTP scheme to a credit scheme if the credit scheme may allow for charge-backs. Also, inputs from the machine learning system(s) 532 (e.g., Ethos) may provide out-of-band, non-real-time machine learning feedback to adjust payment routes as subtle trends are identified.

Figure 6:
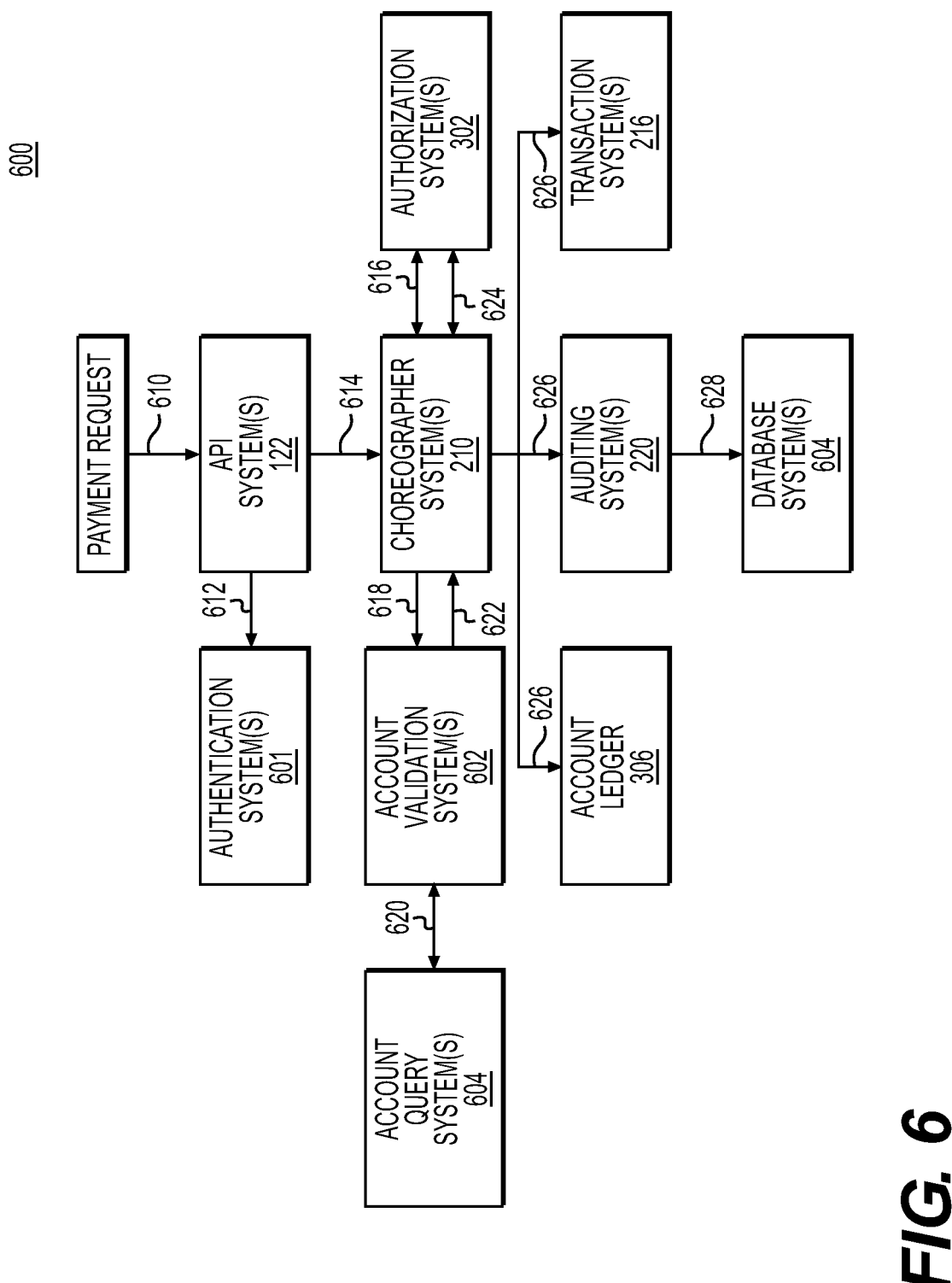
FIG. 6 illustrates a flowchart of an exemplary method of executing an electronic transaction, according to one aspect of the present disclosure.

FIG. 6 illustrates a flowchart of an exemplary method 600 of executing an electronic transaction of the present disclosure. Exemplary process flows of the method 600, performed in accordance with the systems 100, 200, and 300 above, are described hereinafter.

At step 610, the API system(s) 122 may receive a payment request from a user (e.g., requestor system(s) 110). At step 612, the API system(s) 122 may communicate with the authentication system(s) 302 to authenticate the user. The authentication system(s) 302 may communicate with an identity provider (IdP) of the transaction processor 120 to verify the authenticity of the identity of the user. At step 614, the API system(s) 122 may transmit the payment request to the choreographer system(s) 210. At step 616, the choreographer system(s) 210 may make an internal API call to an authorization system(s) 601 of the transaction processor. The authorization system(s) 601 may verify whether the user has permissions to perform a payment request. The authorization system(s) 601 may then transmit an authorization response to the choreographer system(s) 210. At step 618, the choreographer system(s) 210 may make an internal API call to an account validation system(s) 602 to verify whether the referenced bank accounts associated with the payment request exists in the transaction processor 120. At step 620, the account validation system(s) 602 may communicate with an account query system(s) 604 of the transaction processor 120 to confirm whether the bank accounts associated with the payment request exists outside of the transaction processor 120. At step 622, the account validation system(s) 602 may transmit a validation response message to the choreographer system(s) 210. At step 624, the choreographer system(s) 210 may make an internal API call to the authorization system(s) 601 to verify that the user has permission to transact against the sender account. The authorization system(s) 601 may then transmit an authorization response to the choreographer system(s) 210. At step 626, the choreographer may publish a payment request message to the account ledger system(s) 306, the auditing system(s) 220, and the transaction system(s) 216. The choreographer system(s) 210 may also respond back to the user that the payment request has been accepted for processing. Further, the payment request message may be sent to its subscribers for processing. For example, the routing system(s) 214 may receive the payment request event and may begin processing the payment. The transaction query system may receive the payment request event and update its NoSQL database. The account ledger system(s) 306 may receive the payment request event and may ignore it since they payment has not yet been completed. At step 628, the auditing system(s) 220 may transmit the payment request event to the database system(s) 604 for analytics.

FIG. 7 illustrates a flowchart of another exemplary method 700 of requesting an electronic transaction in accordance with the present disclosure. Exemplary process flows of the method 700, performed in accordance with the systems 100, 200, 300, and 500 above, are described hereinafter.

At step 702, an application programing interface (API) system (e.g., the API system(s) 122) may receive an electronic transaction request from a user. As described above, the request may be received from a requesting device over the Internet, at a computer server hosting the transaction processor. The electronic transaction request may be a request to transmit electronic funds to one or more receivers. Further, the API system may execute a user authentication check based on the electronic transaction request by communicating with an authentication system.

At step 704, the API system may transmit the electronic transaction request to a choreographer system (e.g., the choreographer system(s) 210). At step 706, the choreographer system may transmit a validation API call based on the electronic transaction request to an account system (e.g., the account validation system(s) 304). At step 708, the account system may determine whether an account associated with the electronic transaction request exists in the real-time transaction system. At step 710, the choreographer system may transmit an authorization API call based on the electronic transaction request to an authorization system (e.g., the authorization system 302). At step 712, the choreographer system may receive an authorization response from the authorization system. The choreographer system may transmit a transaction acceptance message to the user based on the authorization response. At step 714, the choreographer system may transmit an electronic transaction request message to at least one of a routing engine (e.g., the routing system(s) 214), an account ledger system (e.g., the account ledger system(s) 306), an audit system (e.g., the auditing system(s) 220), and/or a transaction system (e.g., the transaction system(s) 216). In one embodiment, the electronic transaction request message is a Kafka message.

In one embodiment, the routing system may transmit the electronic transaction request to a connection system (e.g., the connection system(s) 130). The connection system may transmit the electronic transaction request to a transaction network (e.g., the transaction network(s) 140). The connection system comprises at least one of a transaction scheme adapter (e.g., RTP adapter 312a, ACH adapter 312b, wire adapter 312n, etc.), a transaction scheme connectors (e.g., connectors 314a-314n), and a service provider interface. Further, transmitting, by the routing system, the electronic transaction request to an optimal transaction scheme.

Figure 8:
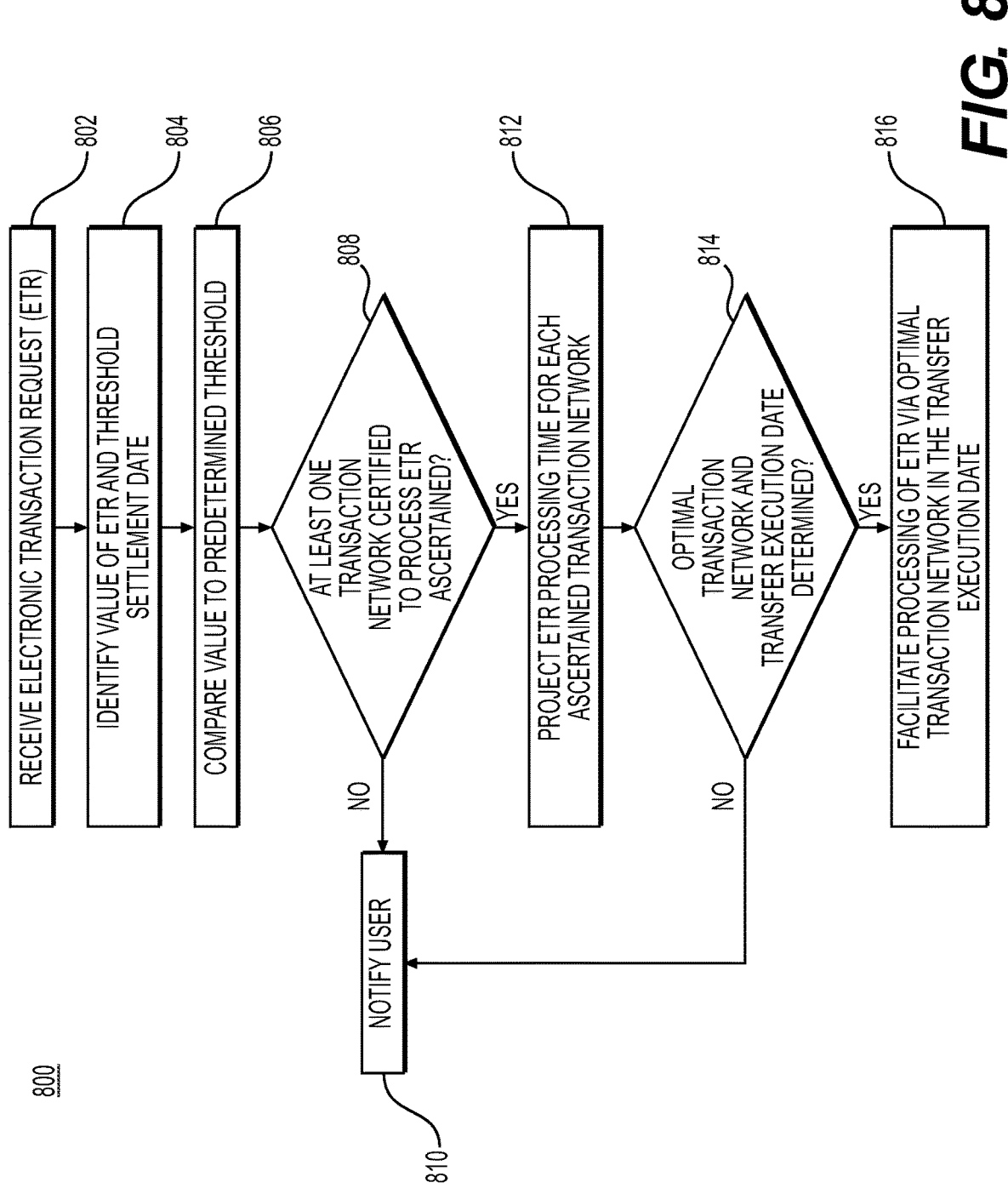
FIG. 8 illustrates a flowchart of another exemplary method of executing an electronic transaction, according to one aspect of the present disclosure.

FIG. 8 illustrates a flowchart of another exemplary method 800 of requesting an electronic transaction in accordance with the present disclosure. Exemplary process flows of the method 800, performed in accordance with the systems 100, 200, 300, 400, and 500 above, are described hereinafter.

At step 802, an application programing interface (API) system (e.g., the API system(s) 122) may receive an electronic transaction request from a user. As described above, the request may be received from a requesting device over the Internet, at a computer server hosting the transaction processor. The electronic transaction request may be a request to transmit electronic funds to one or more receivers. Further, the API system may execute a user authentication check based on the electronic transaction request by communicating with an authentication system.

At step 804, the API system may identify one or more characteristics associated with the electronic transaction request. More particularly, the API system may identify one or both of: the value of funds associated with the electronic transaction request and/or a threshold settlement date. In the context of this application, the threshold settlement date may be a deadline by which the funds associated with the electronic transaction request are required to be in an account associated with a target fund recipient.

In one embodiment, the threshold settlement date may be specified by a user (e.g., via interaction with an API system user interface on their local device, etc.) and an indication of this designation may be contained within the electronic transaction request. In another embodiment, the threshold settlement date may be dynamically determined by the API system. More particularly, the API system may have access to one or more types of context data associated with the user and/or the target fund recipient that may provide an indication of a desired threshold settlement date. Relevant types of context data may include, but are not limited to, communication data (e.g., e-mails, text messages, social media messages, etc.), calendar data, media data (e.g., a publicized announcement of a transaction that the target fund recipient will engage in, etc.), and the like. The foregoing types of context data may be readily available to the API system or, alternatively, the API system may only be able to access context data that has been permissioned by a user of the API system and/or a fund recipient.

At step 806, the API system may compare the value of the funds designated in the electronic transaction request to a predetermined monetary threshold. In an embodiment, the predetermined monetary threshold may be a transaction limit established by an entity (e.g., a particular financial institution/organization, a national regulatory authority, the user, the fund recipient, etc.) that may be adjustable over time. In an embodiment, multiple predetermined monetary thresholds may exist. In such a situation, the user may specify which of the available predetermined monetary thresholds to designate as the primary threshold for the transaction execution process.

At step 808, the API system may ascertain one or more transaction networks, as previously listed above, that are certified to process the electronic transaction request based upon the value of the funds in the electronic transaction request. More particularly, certain transaction networks may be unable to facilitate electronic funds transfer for funds in excess of the predetermined monetary threshold. Accordingly, an embodiment may filter out those transaction networks (i.e., from a pool of available transaction networks) that would be unable to process the electronic transaction request due to the fund value. In an embodiment, the ascertaining process may account for currency discrepancies between the funds in the electronic transaction request and the predetermined monetary threshold value. More particularly, if the fund value in the electronic transaction request is in U.S. dollars but the predetermined monetary threshold is designated in pound sterling (i.e., "the pound"), an embodiment may dynamically convert the predetermined monetary threshold value from pounds to U.S. dollars (e.g., based on currency rates obtained in substantially real-time, etc.).

Responsive to determining, at step 808, that no transaction networks are capable of processing the funds in the electronic transaction request, an embodiment may, at step 810, a notification may be transmitted to a user informing them of this result. Additionally or alternatively, the notification may be accompanied, if possible, by an explanation regarding why none of the transaction networks, or just a particular transaction network, was not able to be utilized to transfer the funds (e.g., fund amount was too high, one or more transaction networks not optimized or certified to function in the user's or fund recipient's geographic area, etc.). Conversely, responsive to determining, at step 808, that at least one transaction network is capable of processing the funds in the electronic transaction request, an embodiment may, at step 812, project a fund processing time for each ascertained transaction network.

In an embodiment, the projection of the fund processing time may be facilitated in one or more different ways. For instance, an embodiment may access a database (e.g., a database that is stored on the user's device, a database that is stored on a cloud server, a database that is stored at another remote location but is nevertheless accessible to the API system, etc.) that contains a list of designated associations between transaction networks and average fund processing times for each transaction network. Additionally or alternatively, in another embodiment, the fund processing time may be dynamically identified via access to historical and/or crowdsourced data. For example, subsequent to ascertaining, at step 808, the relevant transaction networks certified to process the funds in the electronic transaction request, the API system may access historical fund processing length data from an available source (e.g., the Internet, organizational financial logs, etc.). In an embodiment, the projected fund processing time may correspond to a single value (e.g., funds are projected to process in 2 business days, etc.) or may correspond to a fund processing range (e.g., funds are projected to process in 3 to 5 business days, etc.).

At step 814, the API system may determine an optimal transaction network that may process the electronic transaction request as well as a transfer execution date. In the context of this application, the transfer execution date may correspond to the latest date that the funds in the electronic transaction request may be processed for those funds to be settled in the recipient's account by the identified threshold settlement date. In an embodiment, the determination may be facilitated, at least in part, by comparing the projected processing time for each of the ascertained transaction networks to a timeline designated by the receipt date of the electronic transaction request and the threshold settlement date. In an embodiment, the API system may utilize the longest projected fund processing date associated with each transaction network in the determination process for this determination. For example, if a projected fund processing time for Transaction Network X is 3-5 business days, an embodiment may utilize the longest projected time the funds may be processed into the recipient's account, i.e., 5 business days.

In an embodiment, if only one transaction network is identified as satisfying the criteria set forth above (i.e., a transaction network that is both certified to process the funds at the given value and that has a projected funds processing time that satisfies the parameters of the given timeline), then an embodiment may simply utilize that transaction network in the facilitation of funds transfer, as described below in step 816. However, responsive to identifying that a plurality of transaction networks are viable options, an embodiment may default to the transaction network that is the least cost. For example, if ACH, SD ACH, RTP, and credit cards are all viable options based on the fund value and the identified timeline, the API system may select ACH as the optimal transaction network as that is the least cost network of the available options.

In an embodiment, a user may designate a default transaction network through which the funds may be processed. For example, a user may designate that funds processing should occur over an RTP system. If the RTP system is selected, the system may check if the routing number of the vendor bank is certified as an RTP Receiver. If it is not, then an embodiment may automatically select another transaction network utilizing the systems and processes outlined above.

Responsive to determining, at step 814, that there is no optimal transaction network given the criteria and/or that a transfer execution date cannot be identified based upon the given criteria, an embodiment may, at step 810, take no additional action (i.e., the API system may not process the electronic transaction request) and/or may transmit a notification to the user of the API system and/or the owner of the recipient account that the electronic transaction request cannot be processed by the threshold settlement date. Additionally or alternatively, an embodiment may transmit a notification (e.g., a visual notification presented on a display of a device, an audible notification emitted through speakers on a device, a combination thereof, etc.) that queries one or both of the initiator of the electronic transaction request and the intended recipient to confirm that they want to proceed with the transaction even if it will arrive after the settlement date. Only after receiving confirmation input from an individual may an API system proceed, at step 816, with the processing of funds. Conversely to the foregoing, responsive to determining, at step 814, an optimal transaction network and a transfer execution date, an embodiment may, at step 816, facilitate transfer of the funds associated with the electronic transfer request into the recipient account on the transfer execution date via the optimal transaction network. In an embodiment the facilitation of the funds transfer may be implemented automatically by the API system and may not require receipt of any additional user input.

Listed below are pluralities of example implementations of the concepts described above with reference to FIG. 8. It is important to note that these examples are non-limiting, and the situations and values delineated by these examples are solely for illustrative purposes only and that the concepts described above may be utilized in real-life implementations not explicitly described here.

In one non-limiting example implementation, an embodiment may receive, at the API system on a receipt date (e.g., September 14$^{th}$), an electronic transaction request to transfer $150,000 to an account of a designated recipient. The electronic transaction request may contain an indication that the funds need to be transferred to and settled in the recipient account by a settlement date (e.g., September 21$^{st}$). An embodiment may then identify one or more transaction networks capable of processing the requisite funds by comparing the fund value to a predetermined monetary threshold. Given that the predetermined monetary threshold in the instant scenario is $100,000, only the ACH transaction network may be a viable option because only the ACH transaction network may be certified to process funds greater than $100,000. An embodiment may thereafter identify that funds processed via ACH take 3-5 business days to process. Accordingly, to ensure that the funds are settled in the recipient account by the settlement date, an embodiment may identify that the funds need to be processed, or executed, by September 15$^{th}$ (i.e., the execution date). This date accounts for the longest average ACH processing time (i.e., 5 days) in order to ensure that the funds will be in the recipient account by September 21$^{st}$, i.e., the threshold settlement date.

In another non-limiting example implementation, an embodiment may receive, at the API system on a receipt date (i.e., September 21$^{st}$), an electronic transaction request to transfer $80,000 to an account of a designated recipient by a threshold settlement date (i.e., September 25$^{th}$). Given a predetermined monetary threshold of $100,000, an embodiment may identify that two transaction networks may be certified to process the funds associated with the electronic transaction request (e.g., ACH and SD ACH). Given the 4 day timeline delineated by the receipt date and the threshold settlement date, an embodiment may identify that the longest average processing time for ACH transactions (i.e., 5 business days) may jeopardize the ability of the funds to be settled in the recipients' account by the threshold settlement date. Accordingly, an embodiment may determine that SD ACH (i.e., having an average processing time of 1 business day) is the optimal transaction network to use and the execution date may occur on September 25$^{th}$.

In yet another non-limiting example implementation, an embodiment may receive, at the API system on a receipt date (i.e., September 21$^{st}$), an electronic transaction request to transfer $120,000 to an account of a designated recipient by a threshold settlement date (i.e., September 24$^{th}$). Given a predetermined monetary threshold of $100,000, an embodiment may identify that only the ACH transaction network is certified to process the funds associated with the electronic transaction request. However, given the 3 day timeline delineated by the receipt date and the threshold settlement date, an embodiment may identify that there is a moderate to high risk that the funds will not settle in the recipients' account by the threshold settlement date given the average processing time for ACH transactions (i.e., 3-5 business days). Accordingly, an embodiment may transmit a notification to the user of the API system to notify them of this determination and/or to query them if they want to proceed with the transaction despite the risk involved. Responsive to receiving a positive confirmation to the query, an embodiment may thereafter process the funds on September 21$^{st}$ using ACH.

FIG. 9 illustrates a flowchart of another exemplary method 900 of requesting an electronic transaction in accordance with the present disclosure. Exemplary process flows of the method 900, performed in accordance with the systems 100, 200, 300, and 500 above, are described hereinafter.

At step 902, an application programming interface (API) system (e.g., the API system(s) 122) may identify a fund value of a received electronic transaction request as well as a receipt date for the electronic transaction request. At step 904, the API system may identify a value of the electronic transaction request as well as a threshold settlement date. In one embodiment, the threshold settlement date may be explicitly indicated by a user of the API system. Alternatively, in another embodiment, the threshold settlement date may be dynamically determined by the API system (e.g., via access to and analysis of one or more types of available context data, etc.). At step 906, the API system may compare the value of the electronic transaction request to a predetermined threshold and ascertain, at step 908, those transaction networks that are certified to process the value of the funds in the electronic transaction request. For example, in the situation where the value of the funds in the electronic transaction request is greater than the predetermined threshold, an embodiment may filter out from consideration any transaction network that is not certified to process funds at least as large as the value of the predetermined threshold.

At step 910, the API system may project an average processing time for each of the transaction networks ascertained to be able to process the funds associated with the electronic transaction request. More particularly, in situations where the average processing time for a transaction network is represented as an average processing range (e.g., 3-5 business days, etc.), an embodiment may identify, as the projected average processing time, the longest average processing time for that transaction network from the average processing range (e.g., 5 business days from the average range of 3-5 business days, etc.).

At step 912, the API system may determine the lowest cost optimal transaction network that is capable of processing funds into a recipient account by the threshold settlement date. More particularly, given a situation in which at least two transaction networks are both certified to process the value of funds associated with the electronic transaction request and whose average fund processing time comports to a timeline delineated by a receipt date and threshold settlement date, an embodiment may choose the lowest cost option of those transaction networks. Additionally, at step 912 the API system may identify a transfer execution date by which the electronic transaction request must be processed through the lowest cost optimal transaction network in order for the funds to be settled in the recipient account by the settlement date. Subsequent to each of the foregoing steps, at step 914 the API system may facilitate automatic processing of the electronic transaction request into a recipient account via the lowest cost optimal transaction network on the determined transfer execution date. Once an indication is received by the API system that the funds are successfully deposited into the recipient account, an embodiment may automatically transmit a notification to a device associated with the user, the funds recipient, both, etc.

Figure 10:
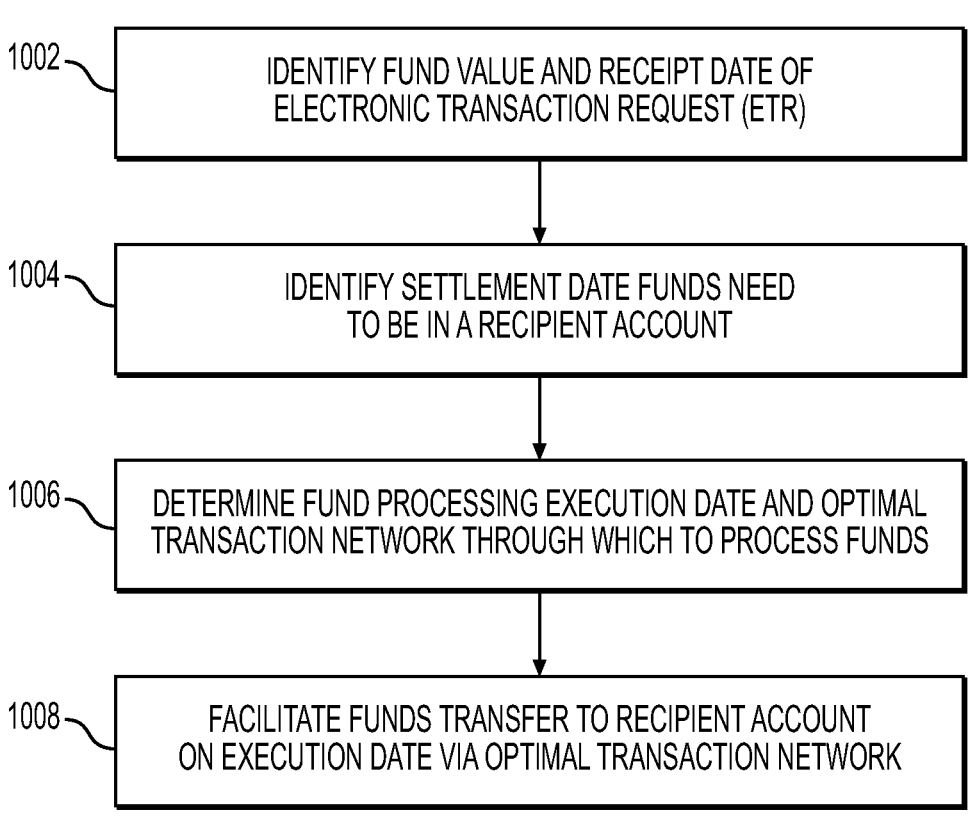
FIG. 10 illustrates a flowchart of another exemplary method of executing an electronic transaction, according to one aspect of the present disclosure.

FIG. 10 illustrates a flowchart of another exemplary method 1000 of requesting an electronic transaction in accordance with the present disclosure. Exemplary process flows of the method 1000, performed in accordance with the systems 100, 200, 300, and 500 above, are described hereinafter.

At step 1002, an application programing interface (API) system (e.g., the API system(s) 122) may identify a fund value of a received electronic transaction request as well as a receipt date for the electronic transaction request. At step 1004, an embodiment may identify a settlement date (e.g., as designated by a funds recipient, as determined dynamically by the API system, etc.) that the funds need to be settled into a recipient account. At step 1006, an embodiment may determine an execution date by which to process the funds into the recipient account by an optimal transaction network. The determination may involve one or more of: identifying which transaction network is certified to process the funds based on their value, identifying the average fund processing time for each transaction network that is certified to process those funds, and comparing the identified processing time to an instant timeline (i.e., as designated by the receipt date of the funds and the identified settlement date). Responsive to this determination, an embodiment may, at step 1008, facilitate funds transfer from a first account to the recipient account on the execution date via the optimal transaction network.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 11:
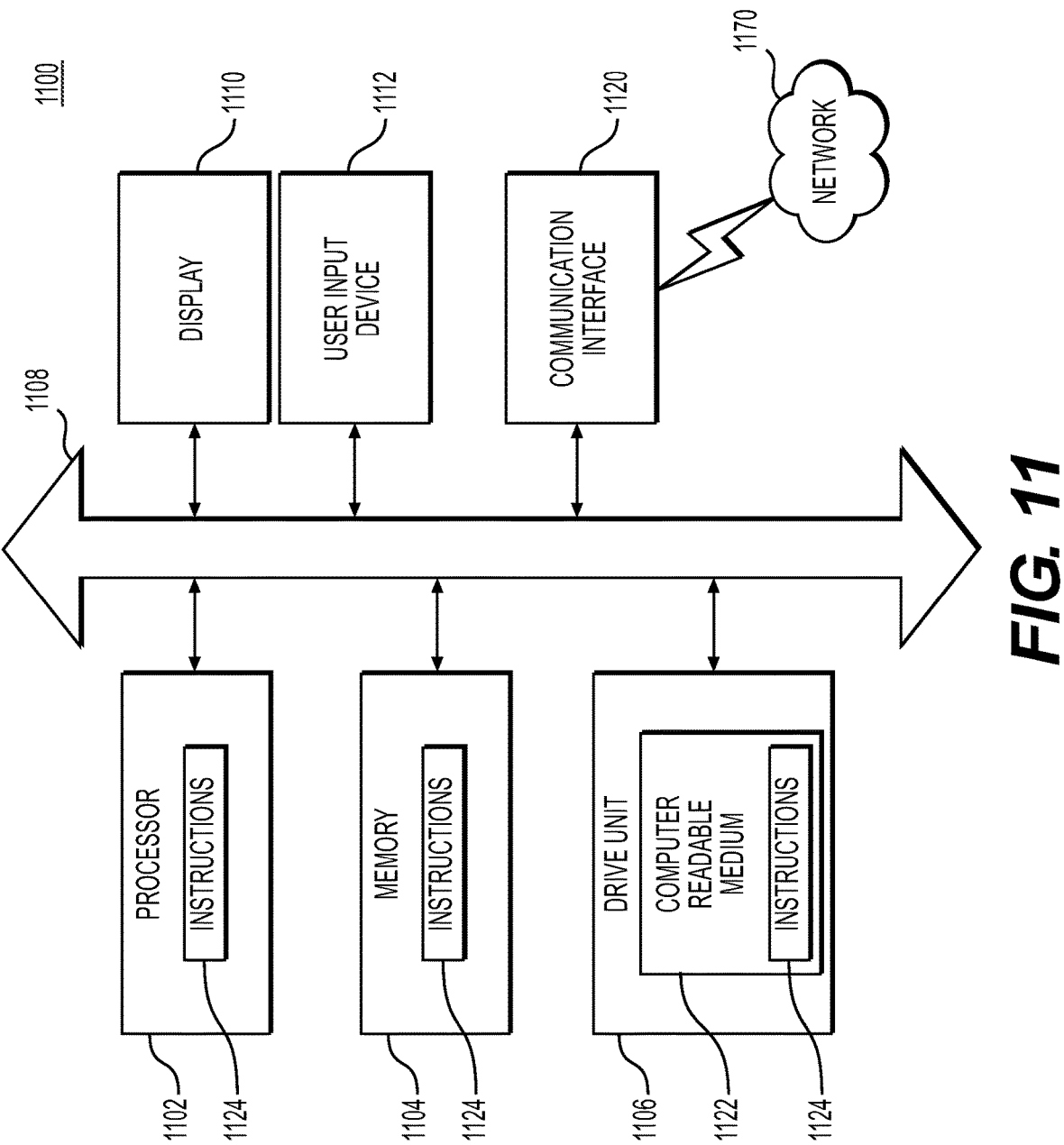
FIG. 11 illustrates a computer system for executing the techniques described herein.

FIG. 11 illustrates a computer system designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system 1100 may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1100 can be implemented using electronic devices that provide voice, video, or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1104 includes a cache or random-access memory for the processor 1102. In alternative implementations, the memory 1104 is separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described herein may be performed by the programmed processor 1102 executing the instructions stored in the memory 1104. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 1100 may further include a display unit 1110, such as a liquid crystal display (LCD), an organic light emitting diode (OLED), a flat panel display, a solid-state display, a cathode ray tube (CRT), a projector, a printer or other now known or later developed display device for outputting determined information. The display 1110 may act as an interface for the user to see the functioning of the processor 1102, or specifically as an interface with the software stored in the memory 1104 or in the drive unit 1106.

Additionally or alternatively, the computer system 1100 may include an input device 1112 configured to allow a user to interact with any of the components of system 1100. The input device 1112 may be a number pad, a keyboard, or a cursor control device, such as a mouse, or a joystick, touch screen display, remote control, or any other device operative to interact with the computer system 800.

The computer system 1100 may also or alternatively include a disk or optical drive unit 1106. The disk drive unit 1106 may include a computer-readable medium 1122 in which one or more sets of instructions 1124, e.g., software, can be embedded. Further, the instructions 1124 may embody one or more of the methods or logic as described herein. The instructions 1124 may reside completely or partially within the memory 1104 and/or within the processor 1102 during execution by the computer system 1100. The memory 1104 and the processor 1102 also may include computer-readable media as discussed above.

In some systems, a computer-readable medium 1122 includes instructions 1124 or receives and executes instructions 1124 responsive to a propagated signal so that a device connected to a network 1170 can communicate voice, video, audio, images, or any other data over the network 1170. Further, the instructions 1124 may be transmitted or received over the network 1170 via a communication port or interface 1120, and/or using a bus 1108. The communication port or interface 1120 may be a part of the processor 1102 or may be a separate component. The communication port 1120 may be created in software or may be a physical connection in hardware. The communication port 1120 may be configured to connect with a network 1170, external media, the display 1110, or any other components in system 1100, or combinations thereof. The connection with the network 1170 may be a physical connection, such as a wired Ethernet connection or may be established wirelessly as discussed below. Likewise, the additional connections with other components of the system 1100 may be physical connections or may be established wirelessly. The network 1170 may alternatively be directly connected to the bus 1108.

While the computer-readable medium 1122 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1122 may be non-transitory, and may be tangible. Specifically, in the context of this document, the computer readable medium is not a signal and "non-transitory" may include all media except signal media.

The computer-readable medium 1122 can include a solid-state memory such as a memory card or other package that houses one or more non-volatile read-only memories. The computer-readable medium 1122 can be a random-access memory or other volatile re-writable memory. Additionally or alternatively, the computer-readable medium 1122 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1100 may be connected to one or more networks 1170. The network 1170 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1170 may include wide area networks (WAN), such as the Internet, local area networks (LAN), campus area networks, metropolitan area networks, a direct connection such as through a Universal Serial Bus (USB) port, or any other networks that may allow for data communication. The network 1170 may be configured to couple one computing device to another computing device to enable communication of data between the devices. The network 1170 may generally be enabled to employ any form of machine-readable media for communicating information from one device to another. The network 1170 may include communication methods by which information may travel between computing devices. The network 1170 may be divided into sub-networks. The sub-networks may allow access to all of the other components connected thereto or the sub-networks may restrict access between the components. The network 1170 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method of executing an electronic transaction by a real time transaction system, the method comprising:

receiving, at an application programing interface (API) system and from a computing device, an electronic transaction request associated with a user and a receipt date;

determining, using a processor of the API system and without input from the user or a target recipient, a value associated with the electronic transaction request and a threshold settlement date by which the electronic transaction request is required to be processed to a recipient account associated with the target recipient using electronic communication data associated with the user and the target recipient, wherein the electronic communication data is captured via the API system;

comparing, using the processor of the API system, the value to a predetermined threshold of each of a plurality of available transaction networks;

determining, using the processor of the API system, at least one transaction network certified to process the electronic transaction request based on the value being below the predetermined threshold;

determining, using the processor of the API system, a processing time for the electronic transaction request for each of the at least one transaction networks certified to process the electronic transaction request;

determining, using the processor of the API system and based on the receipt date and the processing time for each of the at least one transaction networks, an optimal transaction network from the at least one transaction network and a transfer execution date, wherein the optimal transaction network is certified to process the electronic transaction request and configured to process the electronic transaction request by the transfer execution date at a least cost, and wherein the transfer execution date is a latest date by which the electronic transaction request is executable via the optimal transaction network for the value of the electronic transaction request by the threshold settlement date, wherein the determining comprises:

accessing, using the processor of the API system and in a database in electronic communication with the API system, a plurality of stored transaction processing network configurations associated with the at least one transaction network, the plurality of stored transaction processing network configurations including at least a transaction processing cost; and determining, using the processor of the API system, the optimal transaction network that is optimally configured to process the electronic transaction request by the transfer execution date at the least cost based on the plurality of stored transaction processing network configurations including the transaction processing cost; and processing, by the API system, the electronic transaction request to the recipient account on the transfer execution date via the optimal transaction network.

2. The method of claim 1, wherein determining the threshold settlement date comprises dynamically identifying the threshold settlement date via analyzing context data associated with an owner of the recipient account.

3. The method of claim 1, wherein the at least one transaction network is at least one selected from the group consisting of an Automated Clearing House (ACH) network, a Same Day Automated Clearing House (SD ACH) network, a Real Time Payment (RTP) network, and a credit card network.

4. The method of claim 1, wherein determining the at least one transaction network comprises:

identifying a pool of available transaction networks;

determining which of the available transaction networks is certified to process transactions having a transaction value at least as large as the predetermined threshold; and establishing, as the at least one transaction network, each of the available transaction networks from the pool certified to process transactions of a size at least as large as the predetermined threshold.

5. The method of claim 1, wherein determining the processing time comprises accessing a database comprising a listing of associations between available transaction networks and average processing times associated with each of the available transaction networks.

6. The method of claim 5, wherein determining the processing time further comprises:

identifying a processing range associated with one or more of the average processing times associated with each of the available transaction networks; and establishing, as a projected processing time, a longest processing time from the processing range.

7. The method of claim 1, wherein the processing comprises automatically executing the processing of the electronic transaction request without receipt of additional user input.

8. The method of claim 1, further comprising transmitting, subsequent to the processing, an indication of a successful transfer to at least one of: the user or an owner of the recipient account.

9. The method of claim 1, wherein determining the optimal transaction network comprises referencing one or more additional criteria selected from the group consisting of an upcoming holiday, a national designation for the electronic transaction request, and combinations thereof.

10. A real-time transaction system, comprising:

one or more computer readable media storing instructions for executing a real-time electronic transaction; and one or more processors configured to execute the instructions to perform operations comprising:

receiving, at an application programing interface (API) system and from a computing device, an electronic transaction request associated with a user and a receipt date;

determining, using a processor of the API system and without input from the user or a target recipient, a value associated with the electronic transaction request and a threshold settlement date by which the electronic transaction request is required to be processed to a recipient account associated with the target recipient using electronic communication data associated with the user and the target recipient, wherein the electronic communication data is captured via the API system;

comparing, using the processor of the API system, the value to a predetermined threshold of each of a plurality of available transaction networks;

determining, using the processor of the API system, at least one transaction network certified to process the electronic transaction request based on the value being below the predetermined threshold;

determining, using the processor of the API system, a processing time for the electronic transaction request for each of the at least one transaction networks certified to process the electronic transaction request;

determining, using the processor of the API system and based on the receipt date and the processing time for each of the at least one transaction networks, an optimal transaction network from the at least one transaction network and a transfer execution date, wherein the optimal transaction network is certified to process the electronic transaction request and configured to process the electronic transaction request by the transfer execution date at a least cost, and wherein the transfer execution date is a latest date by which the electronic transaction request is executable via the optimal transaction network for the value of the electronic transaction request to by the threshold settlement date, wherein the determining comprises:

accessing, using the processor of the API system and in a database in electronic communication with the API system, a plurality of stored transaction processing network configurations associated with the at least one transaction network, the plurality of stored transaction processing network configurations including at least a transaction processing cost; and determining, using the processor of the API system, the optimal transaction network that is optimally configured to process the electronic transaction request by the transfer execution date at the least cost based on the plurality of stored transaction processing network configurations including the transaction processing cost; and processing, by the API system, the electronic transaction request to the recipient account on the transfer execution date via the optimal transaction network.

11. The system of claim 10, wherein the operations to identify further comprise:

dynamically identifying the threshold settlement date via analyzing context data associated with an owner of the recipient account.

12. The system of claim 10, wherein the at least one transaction network is at least one selected from the group consisting of an Automated Clearing House (ACH) network, a Same Day Automated Clearing House (SD ACH) network, a Real Time Payment (RTP) network, and a credit card network.

13. The system of claim 10, wherein the operations to determine the at least one transaction network further comprise:

identifying a pool of available transaction networks;

determining which of the available transaction networks is certified to process transactions having a transaction value at least as large as the predetermined threshold; and establishing, as the at least one transaction network, each of the available transaction networks from the pool certified to process transactions of a size at least as large as the predetermined threshold.

14. The system of claim 10, wherein the operations to determine the processing time further comprise:

accessing a database comprising a listing of associations between available transaction networks and average processing times associated with each of the available transaction networks.

15. The system of claim 14, wherein the operations to determine the processing time further comprise:

identifying a processing range associated with one or more of the average processing times associated with each of the available transaction networks; and establishing, as a projected processing time, a longest processing time from the processing range.

16. The system of claim 10, wherein the operations to process further comprise:

automatically executing the processing of the electronic transaction request without receipt of additional user input.

17. The system of claim 10, wherein the operations further comprise:

transmitting, subsequent to the processing, an indication of a successful transfer to at least one of: the user or an owner of the recipient account.

18. A non-transitory computer-readable medium storing instructions for executing a real-time transaction, the instructions, when executed by one or more processors, causing the one or more processors to perform operations, comprising:

receiving, at an application programing interface (API) system and from a computing device, an electronic transaction request associated with a user and a receipt date;

determining, using a processor of the API system and without input from the user or a target recipient, a value associated with the electronic transaction request and a threshold settlement date by which the electronic transaction request is required to be processed to a recipient account associated with the target recipient using electronic communication data associated with the user and the target recipient, wherein the electronic communication data is captured via the API system;

comparing, using the processor of the API system, the value to a predetermined threshold of each of a plurality of available transaction networks;

determining, using the processor of the API system, at least one transaction network certified to process the electronic transaction request based on the value being below the predetermined threshold;

determining, using the processor of the API system, a processing time for the electronic transaction request for each of the at least one transaction networks certified to process the electronic transaction request;

determining, using the processor of the API system and based on the receipt date and the processing time for each of the at least one transaction networks, an optimal transaction network from the at least one transaction network and a transfer execution date, wherein the optimal transaction network is certified to process the electronic transaction request and configured to process the electronic transaction request by the transfer execution date at a least cost, and wherein the transfer execution date is a latest date by which the electronic transaction request is executable via the optimal transaction network for the value of the electronic transaction request by the threshold settlement date, wherein the determining comprises:

accessing, using the processor of the API system and in a database in electronic communication with the API system, a plurality of stored transaction processing network configurations associated with the at least one transaction network, the plurality of stored transaction processing network configurations including at least a transaction processing cost; and determining, using the processor of the API system, the optimal transaction network that is optimally configured to process the electronic transaction request by the transfer execution date at the least cost based on the plurality of stored transaction processing network configurations including the transaction processing cost; and processing, by the API system, the electronic transaction request to the recipient account on the transfer execution date via the optimal transaction network.

19. The method of claim 1, wherein the electronic transaction request is associated with an electronic payment transaction, and wherein the electronic transaction request comprises a request to transmit an electronic payment.

20. The system of claim 10, wherein the electronic transaction request is associated with an electronic payment transaction, and wherein the electronic transaction request comprises a request to transmit an electronic payment.

\* \* \* \* \*